(12) United States Patent
Han et al.

(10) Patent No.: US 11,946,609 B2
(45) Date of Patent: Apr. 2, 2024

(54) VEHICLE LAMP

(71) Applicant: SL Corporation, Daegu (KR)

(72) Inventors: Hyo Jin Han, Gyeongsan-si (KR); Jin Ho Jo, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/333,610

(22) Filed: Jun. 13, 2023

(65) Prior Publication Data
US 2024/0068638 A1 Feb. 29, 2024

(30) Foreign Application Priority Data
Aug. 30, 2022 (KR) .................. 10-2022-0109233

(51) Int. Cl.
| | |
|---|---|
| *F21S 41/265* | (2018.01) |
| *F21S 41/20* | (2018.01) |
| *F21S 41/43* | (2018.01) |
| *F21S 41/63* | (2018.01) |
| *F21Y 115/10* | (2016.01) |

(52) U.S. Cl.
CPC ............ *F21S 41/285* (2018.01); *F21S 41/43* (2018.01); *F21S 41/635* (2018.01); *F21Y 2115/10* (2016.08)

(58) Field of Classification Search
CPC ........ F21S 41/285; F21S 41/43; F21S 41/635; F21Y 2115/10
See application file for complete search history.

(56) References Cited

U.S. PATENT DOCUMENTS

2018/0320852 A1* 11/2018 Mandl ................... F21S 41/151
2021/0199256 A1* 7/2021 Son ......................... F21S 41/26

* cited by examiner

*Primary Examiner* — Elmito Breval
(74) *Attorney, Agent, or Firm* — United One Law Group LLC; Kongsik Kim; Jhongwoo Peck

(57) ABSTRACT

A vehicle lamp includes a light-emitting unit that includes a plurality of light source modules, which are arranged side-by-side, an optical path adjustment unit that includes a plurality of collimator lenses, each of which adjusts a path of light generated by each of the light source modules, and an optical unit that transmits the light, which is incident thereupon after being guided by the optical path adjustment unit, thereby allowing a predetermined beam pattern to be formed. The optical unit includes a first optical lens module, upon which the light guided by the optical path adjustment unit is incident, and a second optical lens module, upon which the light transmitted through the first optical lens module is incident, and each of the first and second optical lens modules includes a plurality of incident lenses and a plurality of exit lenses, which correspond to one another.

12 Claims, 30 Drawing Sheets

VEHICLE LAMP

CROSS-REFERENCE TO RELATED APPLICATION

This application claims priority from Korean Patent Application No. 10-2022-0109233 filed on Aug. 30, 2022, which is incorporated herein by reference in its entirety.

BACKGROUND

1. Technical Field

The present disclosure relates to a vehicle lamp, and more particularly, to a vehicle lamp capable of forming optimal beam patterns while having a slim design.

2. Related Art

In general, a vehicle includes various types of lamps, i.e., lamps having an illumination function for easily verifying any objects around the vehicle under low-light conditions (e.g., nighttime) and lamps having a signaling function for notifying the driving state of the vehicle to other vehicles or nearby road users.

For example, head lamps and fog lamps are mainly for the illumination function, and turn signal lamps, tail lamps, and brake lamps are mainly for the signaling function. Various installation criteria and specifications for vehicle lamps are prescribed by laws and/or regulations so that the vehicle lamps fully perform their designated functions.

Recently, research has been conducted on how to design compact, slim vehicle lamps with the use of micro lenses having a relatively short focal length.

Generally, vehicle lamps are often required to be used for two or more different purposes, but there is a limit in reducing the size of vehicle lamps, if structures are provided separately for forming appropriate beam patterns for such different purposes.

Therefore, a method is needed to realize a slim exterior design for a vehicle lamp while reducing the size thereof, to form beam patterns capable of satisfying a set of light distribution conditions, and to simplify a structure for forming two or more different beam patterns.

SUMMARY

The present disclosure provides a vehicle lamp capable of realizing a surface emission of light with a uniform brightness, via microlenses, and thereby forming beam patterns having a uniform brightness. The present disclosure also provides a vehicle lamp capable of preventing glare to the driver of the preceding or on-coming vehicle by placing a shield for forming beam patterns and an antiglare shield between incident lenses and exit lenses. The present disclosure also provides a vehicle lamp capable of allowing light sources for different beam patterns to share the same substrate, preventing interference between the light sources, and enabling the light sources to generate light having an appropriate brightness. The present disclosure also provides a vehicle lamp capable of realizing a unified appearance, when used for the same lamp purpose with other vehicle lamps, without appearing separated from the other vehicle lamps.

However, aspects of the present disclosure are not restricted to those set forth herein. The above and other aspects of the present disclosure will become more apparent to one of ordinary skill in the art to which the present disclosure pertains by referencing the detailed description of the present disclosure.

According to an aspect of the present disclosure, a vehicle lamp may include a light-emitting unit that includes a plurality of light source modules, which are arranged side-by-side; an optical path adjustment unit that includes a plurality of collimator lenses, each of which adjusts a path of light generated by each of the plurality of light source modules; and an optical unit that transmits the light, which is incident thereupon after being guided by the optical path adjustment unit, thereby allowing a predetermined beam pattern to be formed. The optical unit may include a first optical lens module, upon which the light guided by the optical path adjustment unit is incident, and a second optical lens module, upon which the light transmitted through the first optical lens module is incident. Each of the first optical lens module and the second optical lens module may include a plurality of incident lenses and a plurality of exit lenses, which correspond to one another.

Each of the plurality of light source modules may include a substrate, on which one or more light sources are installed, and a heat dissipator, on which the substrate is mounted. One of the collimator lenses of the optical path adjustment unit or the heat dissipators of the light source modules may be integrally formed, and the other of the collimator lenses or the heat dissipators may be formed separately from one another.

Diffusion patterns may be formed on at least some portion of side surfaces disposed between an incident side and an exit side of each of the plurality of collimator lenses.

The plurality of incident lenses and the plurality of exit lenses may be implemented as microlenses.

In the first optical lens module, an incident lens among the plurality of incident lenses may have a focal length that is equal to a focal length of a corresponding exit lens among the plurality of exit lenses.

The second optical lens module may include an incident lens module, which includes the plurality incident lenses, an exit lens module, which includes the plurality of exit lenses, and an optical member, which is disposed between the incident lens module and the exit lens module. The optical member may include a first light-transmitting member, which includes the incident lens module disposed on an incident side of the first light-transmitting member, and a second light-transmitting member, which includes the exit lens module disposed on an exit side of the second light-transmitting member, and the incident side and an exit side of the first light-transmitting member may be opposite to each other.

The second optical lens module may further include an adhesive layer disposed between the exit side of the first light-transmitting member and an incident side of the second light-transmitting member to join the first light-transmitting member and the second light-transmitting member. One or more alignment elements may be included in at least one of the incident lens module, the exit lens module, the first light-transmitting member, or the second light-transmitting member for aiding positional alignment.

The optical member may include a plurality of first shields, which obstruct some of the light that proceeds toward the plurality of exit lenses, and a plurality of second shields disposed in front of the plurality of first shields. The plurality of first shields may be formed on an incident side of the second light-transmitting member, and the plurality of second shields may be formed on the exit side of the second light-transmitting member.

Each of the plurality of second shields may include at least one of a horizontal shield or a vertical shield. An upper end of the horizontal shield of the plurality of second shields may be disposed below an upper end of a respective first shield among the plurality of first shields.

According to the embodiments of the present disclosure, as the surface emission of light with a uniform brightness can be realized by microlenses, beam patterns can be formed with a uniform brightness. Thus, visibility can be improved, and a sense of heterogeneity can be prevented.

Also, as not only shields for forming a beam pattern, but also shields including horizontal shields and/or vertical shields, may be disposed at incident lenses and exit lenses, glare to the driver of a preceding vehicle or an on-coming vehicle can be prevented.

Also, as substrates can be commonly used for a plurality of light sources for use for different lamp purposes, interference between the light sources can be prevented by light guides, and light with an appropriate brightness can be generated. Accordingly, the structure of a vehicle lamp can be simplified.

Also, as additional images may be generated between two or more vehicle lamps used for the same purpose, the perception of distinction between the vehicle lamps may be prevented, and a more unified appearance may be realized for the vehicle lamps as a whole.

It should be noted that the effects of the present disclosure are not limited to those described herein, and other effects of the present disclosure will be made apparent from the following description.

BRIEF DESCRIPTION OF THE DRAWINGS

The above and other aspects and features of the present disclosure will be made more apparent in the detailed description and with reference to the attached drawings, in which.

DETAILED DESCRIPTION

Figure 1:
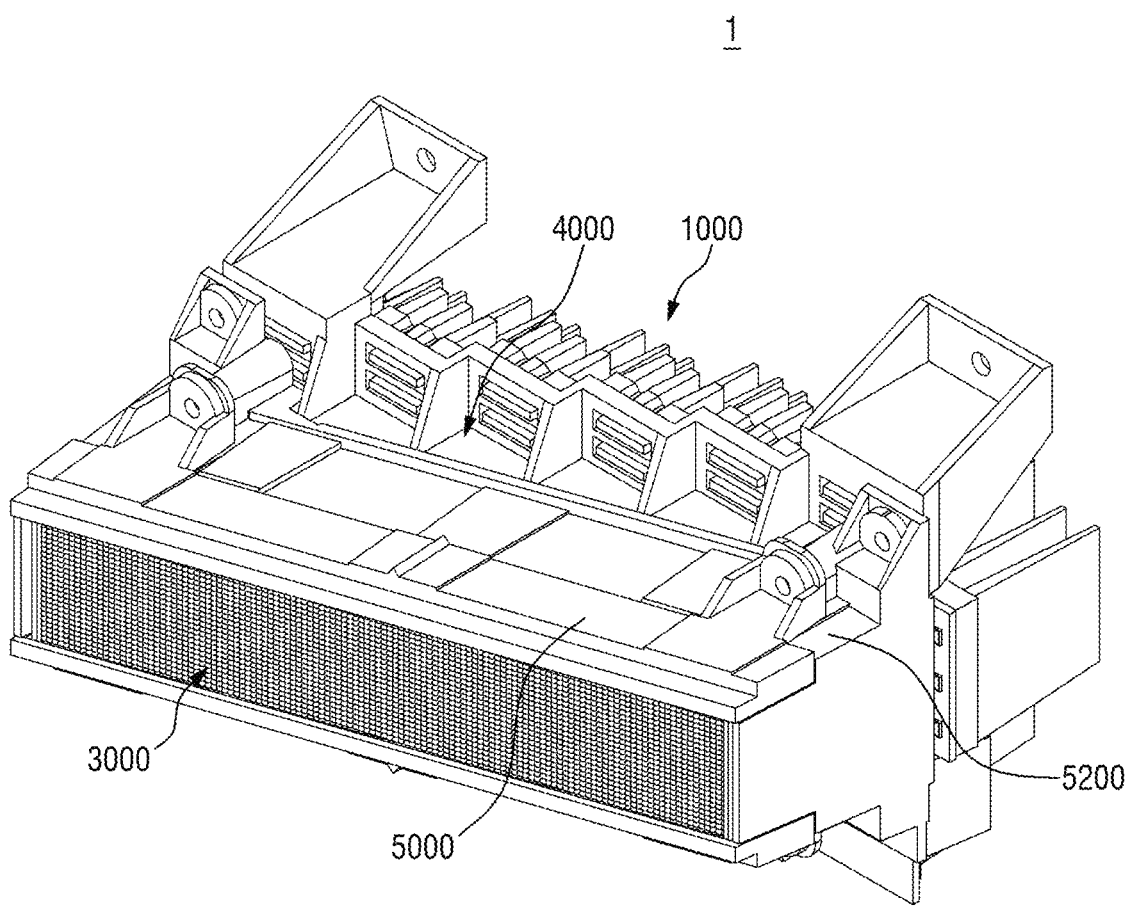
FIGS. 1 and 2 are perspective views of a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described herein with reference to the attached drawings containing plan and cross-sectional schematic illustrations.

As such, variations of the shapes of the illustrations, for example, of manufacturing techniques and/or tolerances, are to be expected. Thus, the embodiments of the invention should not be construed as limited to the particular shapes of regions illustrated herein but are to include deviations in shapes that result, for example, from manufacturing. In the drawings, respective components may be enlarged or reduced in size for convenience of explanation.

Hereinafter, the preset disclosure will be described with reference to the drawings for describing the vehicle lamp according to embodiments of the present disclosure.

Figure 2:
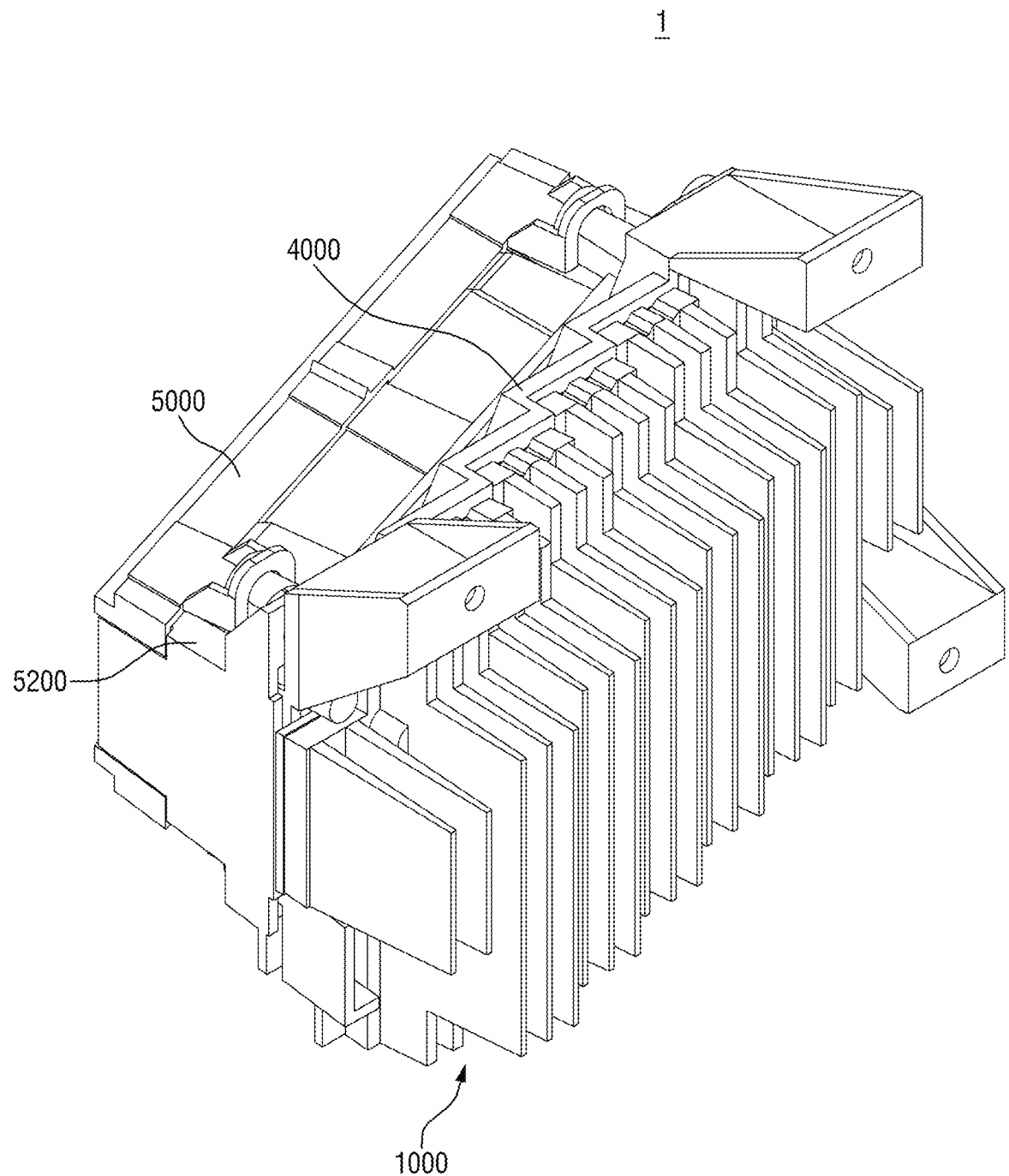
Figure 3:
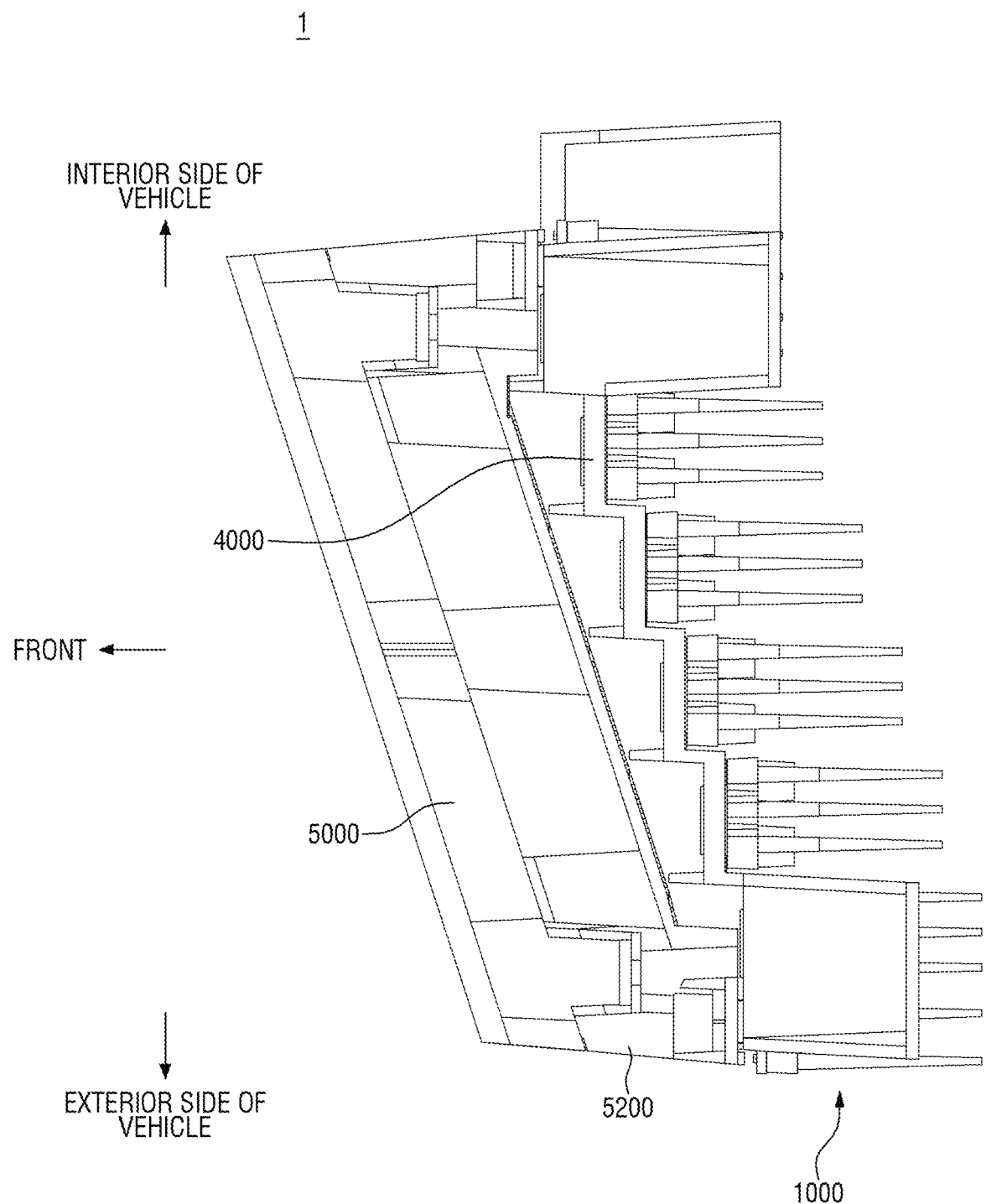
FIG. 3 is a plan view of the vehicle lamp of FIGS. 1 and 2.
Figure 4:
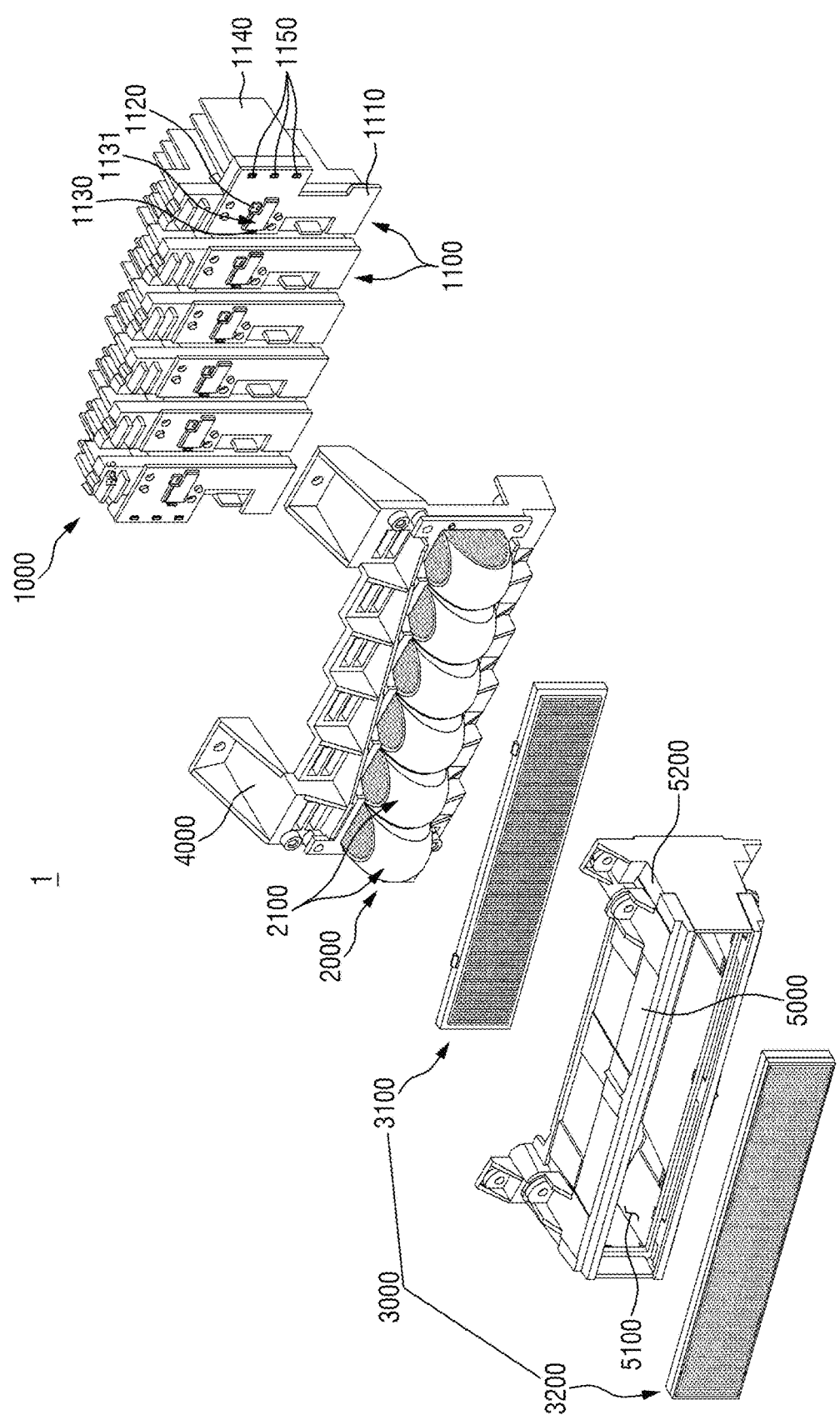
FIGS. 4 and 5 are exploded perspective views of the vehicle lamp of FIGS. 1 and 2.
Figure 5:
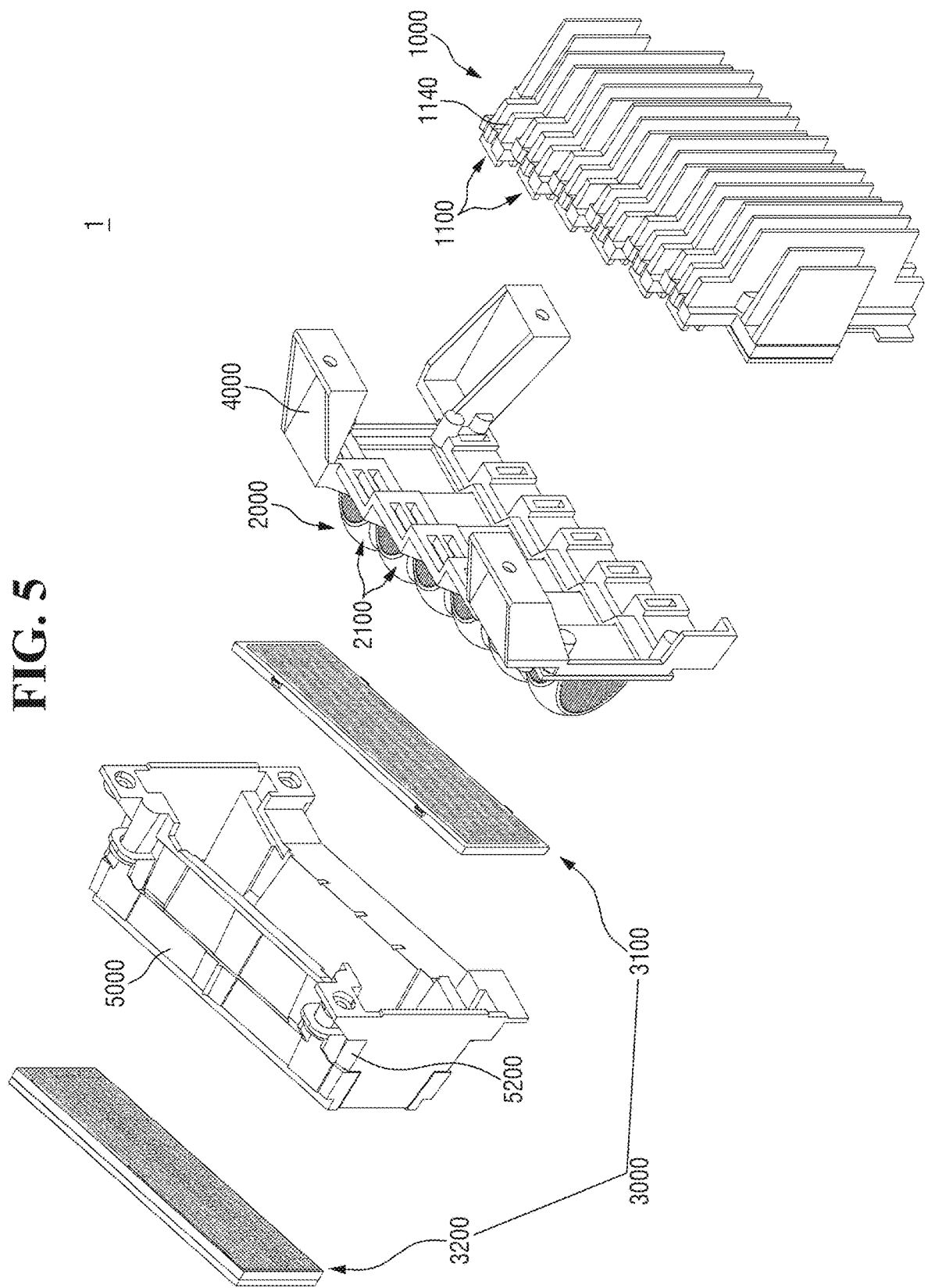
Figure 6:
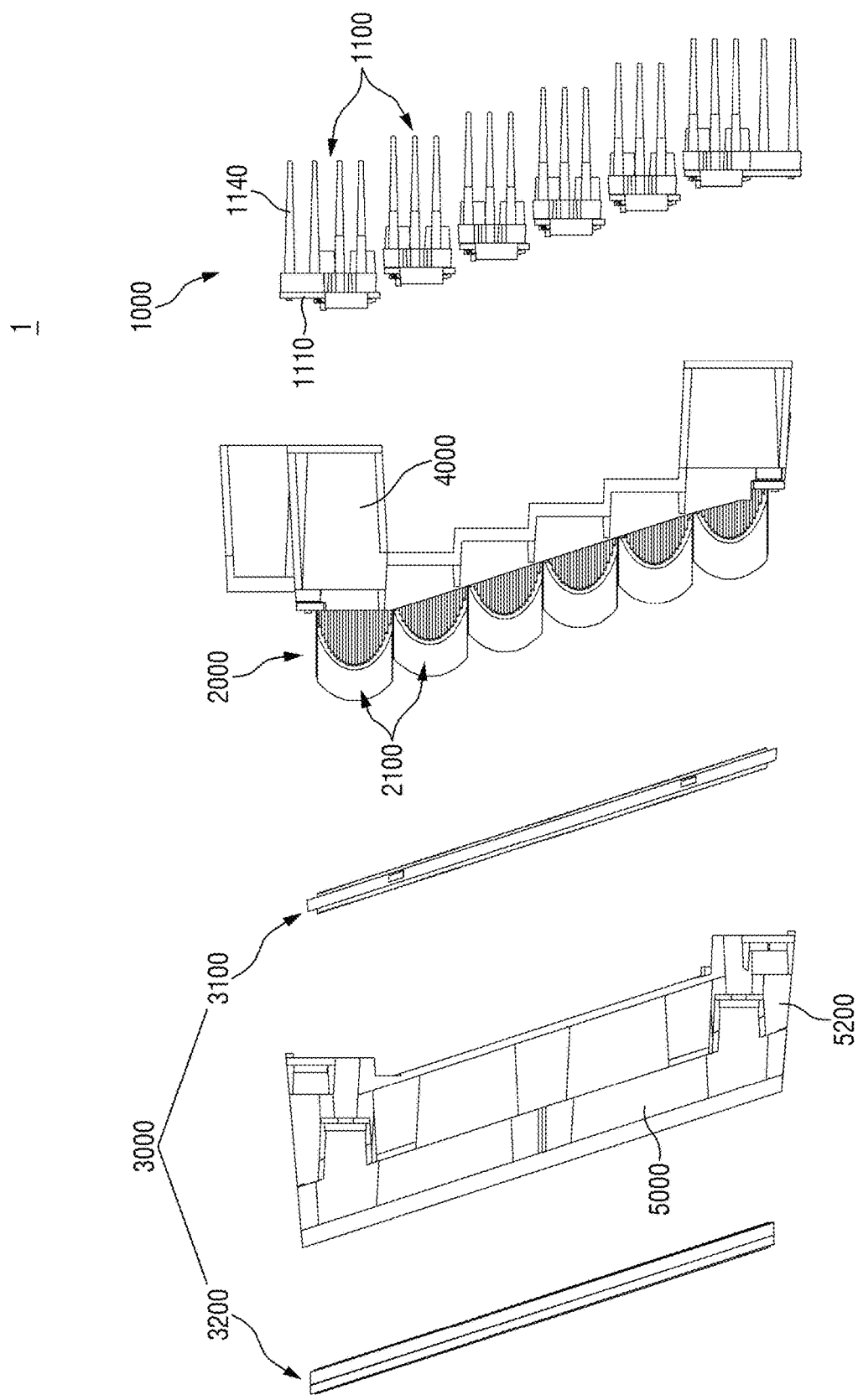
FIG. 6 is an exploded plan view of the vehicle lamp of FIGS. 1 and 2.

FIGS. 1 and 2 are perspective views of a vehicle lamp according to an embodiment of the present disclosure, FIG. 3 is a plan view of the vehicle lamp of FIGS. 1 and 2, FIGS. 4 and 5 are exploded perspective views of the vehicle lamp of FIGS. 1 and 2, and FIG. 6 is an exploded plan view of the vehicle lamp of FIGS. 1 and 2.

Referring to FIGS. 1 through 6, a vehicle lamp 1 may include a light-emitting unit 1000, an optical path adjustment unit 2000, and an optical unit 3000.

The vehicle lamp 1 may be used for at least one of the illumination purposes for securing a field of view for the driver of the vehicle where the vehicle lamp 1 is installed and a signaling purpose for notifying the nearby vehicles, pedestrians, and other road-users about the driving state of the present vehicle.

The vehicle lamp 1 will hereinafter be described as being used, for example, as a headlamp for securing a field of view ahead of the vehicle by irradiating light in the driving direction of the vehicle, but the present disclosure is not limited thereto. The vehicle lamp 1 may be used not only as a headlamp, but also as various other lamps that can be installed in the vehicle for an illumination function, a signaling function, or both, such as a fog lamp, a daytime running lamp, a turn signal lamp, a tail lamp, a backup lamp, a brake lamp, or the like. The vehicle lamp 1 may be used for a single lamp purpose or for two or more lamp purposes.

When the vehicle lamp 1 is used as a headlamp, a low beam pattern or a high beam pattern may be formed by the vehicle lamp 1. The low beam pattern may secure a wider field of view over a relatively short distance ahead of the vehicle, without causing glare to the driver of a preceding or on-coming vehicle, by irradiating light below a predetermined cutoff line. The high beam pattern may secure a longer field of view over a relatively long distance ahead of the vehicle by irradiating light above the cutoff line. The light-emitting unit 1000 may be able to emit light having an appropriate intensity and/or color for the purpose of the vehicle lamp 1.

Figure 7:
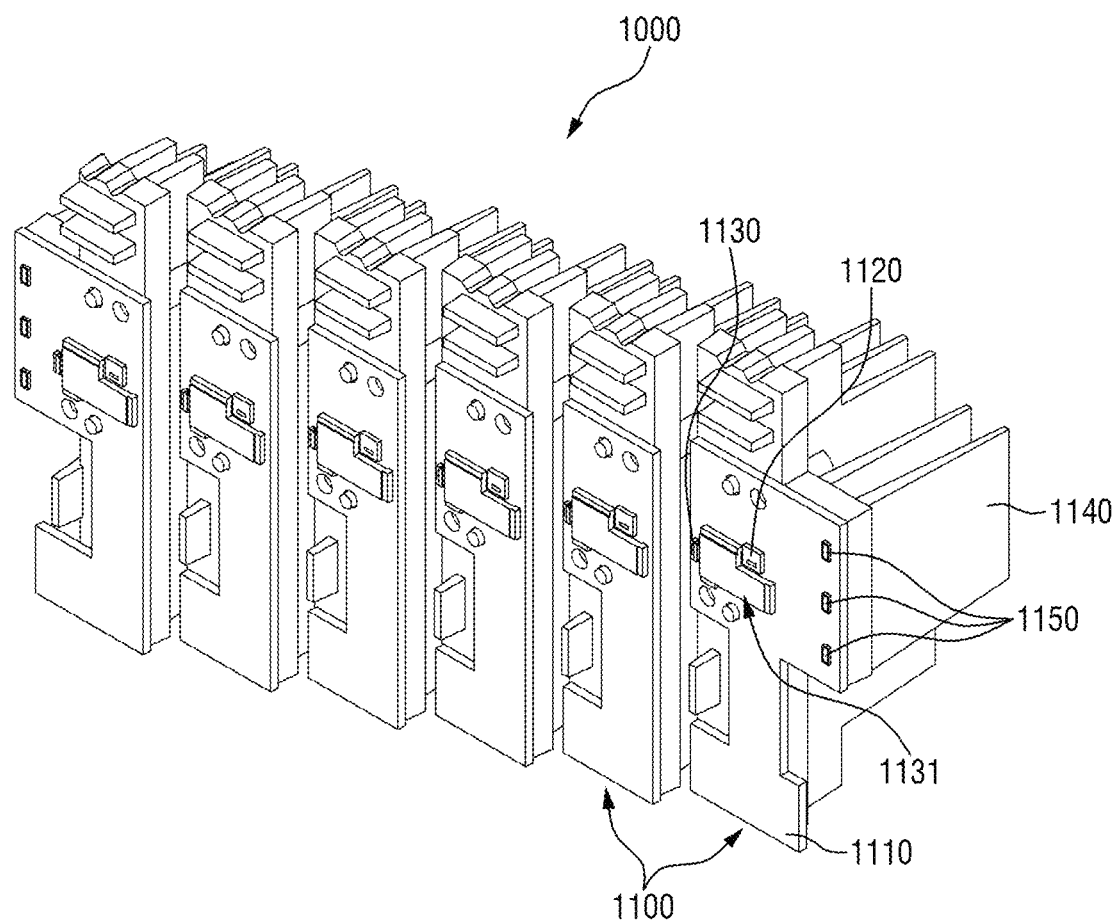
FIG. 7 is a perspective view of a light-emitting unit according to an embodiment of the present disclosure.
Figure 8:
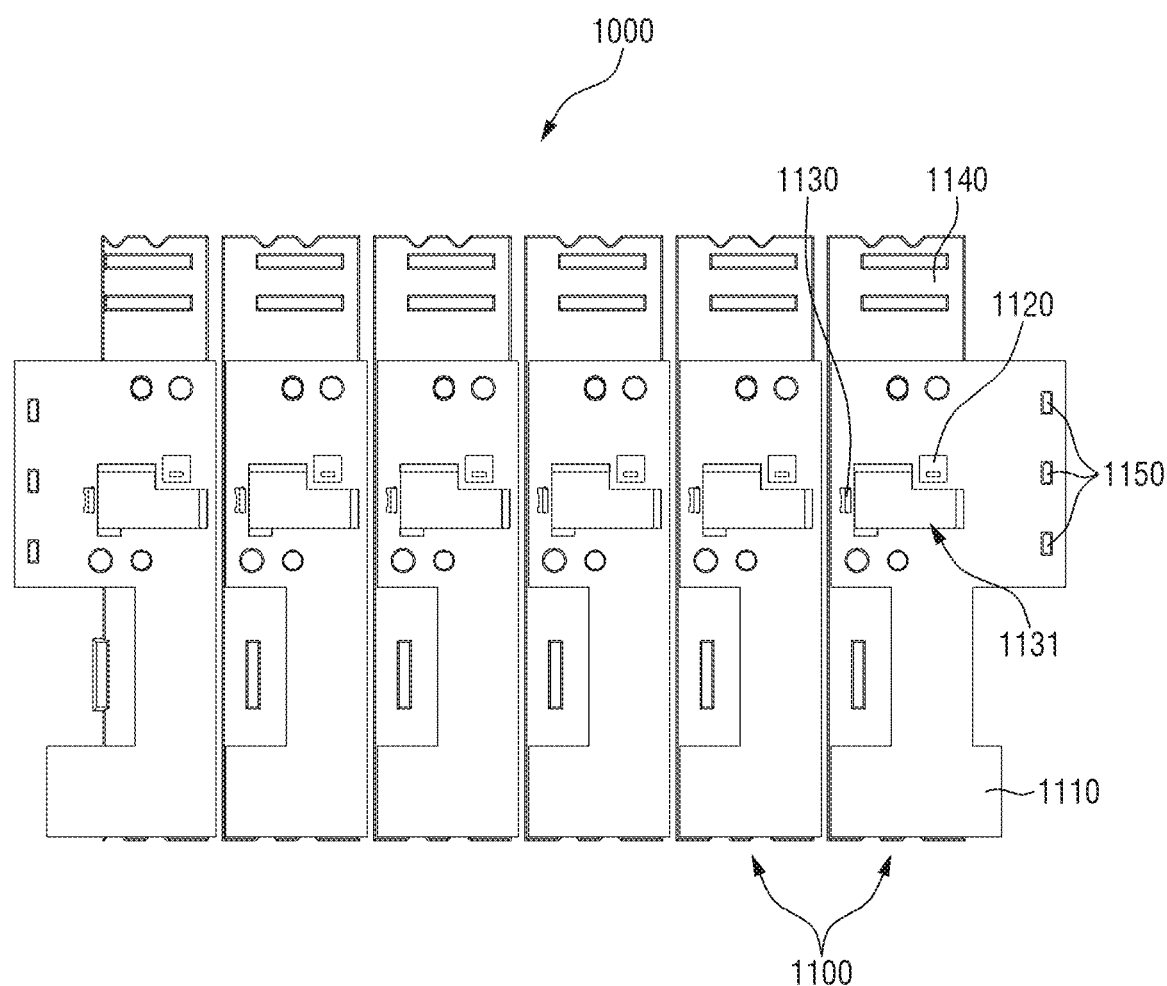
FIG. 8 is a front view of the light-emitting unit of FIG. 7.

FIG. 7 is a perspective view of a light-emitting unit according to an embodiment of the present disclosure, and FIG. 8 is a front view of the light-emitting unit of FIG. 7. Referring to FIGS. 7 and 8, the light-emitting unit 1000 may include a plurality of light source modules 1100, which are arranged in one direction. By way of example, the light source modules 1100 may be arranged in a left-to-right direction (e.g., side-by-side), but the present disclosure is not limited thereto. The light source modules 1100 may be arranged in one or more directions depending on the layout or design of the vehicle lamp 1.

The light source modules 1100 may be arranged in a stepwise fashion to allow them to be disposed gradually rearward going from one side toward the other side of the light-emitting unit 1000, in the left-to-right direction. The light source modules 1100 will hereinafter be described as being arranged in a stepwise fashion so that they are disposed gradually rearward in a direction from the inner side to the outer side of the vehicle.

The light source modules 1100 may be arranged in a stepwise fashion to conform to the shape (e.g., contour) of the body line of the vehicle. In other words, the vehicle lamp 1 may be received in a space formed by a lamp housing and a cover lens coupled to the lamp housing, and as the light source modules 1100 are to be arranged along the exterior shape of the cover lens that forms part of the body line of the vehicle, the positions of the light source modules 1100 may vary depending on the shape of the body line of the vehicle.

Each of the light source modules 1100 may include a substrate 1110, at least one light source 1120 and 1130, and a heat dissipator 1140.

The substrate 1110 may be configured to transmit heat to the heat dissipator 1140. Specifically, when light is generated by the light source 1120 and 1130, which is installed on the substrate 1110, heat may be generated so that the temperature of the light source 1120 and 1130 increases, and due to the heat, the performance of the light source 1120 and 1130 may deteriorate. Thus, the substrate 1110 may be configured to more readily release the heat.

Semiconductor light-emitting elements such as light-emitting diodes (LEDs) may be used as the light source 1120 and 1130, but the present disclosure is not limited thereto. Various other light sources such as laser diodes (LDs) or bulbs may also be used, and optical elements such as a reflector, a prism, or a mirror may be further included depending on the type of the light source 1120 and 1130.

Not only the light source 1120 and 1130, but also various parts and elements for controlling the light source 1120 and 1130 and supplying electrical power may also be installed on the substrate 1110.

The light source 1120 and 1130 may include, for example, a main light source 1120 and an auxiliary light source 1130. The main light source 1120 may form a first beam pattern, and the auxiliary light source 1130 may form a second beam pattern, which is different from the first beam pattern. Accordingly, the vehicle lamp 1 may be used for two or more different lamp purposes. In some embodiments, two or more main light sources 1120 and/or two or more auxiliary light sources 1130 may be provided to satisfy the light amount requirement.

However, the present disclosure is not limited thereto. Alternatively, if the vehicle lamp 1 is for forming one of the first or second beam patterns, one of the main light source 1120 or the auxiliary light source 1130 may be omitted.

The heat dissipators 1140 of the light source modules 1100 will hereinafter be described as being separately provided from one another to form beam patterns that satisfy a set of light distribution conditions in terms of the location, size, shape, and brightness of illumination, and this will be described later in detail.

The vehicle lamp 1 will hereinafter be described as being used not only as a headlamp for the illumination function, but also as a daytime running lamp or a position lamp for the signaling function, and a first beam pattern and a second beam pattern will hereinafter be described as being, for example, a low beam pattern formed by a headlamp and a beam pattern formed by a daytime running lamp or a position lamp, respectively.

In each of the light source modules 1100, the main light source 1120 and the auxiliary light source 1130 may be installed on a common substrate 1110, and the second beam pattern for the signaling function may be required to have a lower intensity than the first beam pattern for the illumination function has. Thus, there is the need to generate light with an appropriate brightness without causing interference between the main light source 1120 and the auxiliary light source 1130.

To this end, the main light source 1120 may be installed to have a light-emitting surface thereof face forward, i.e., face the optical path adjustment unit 2000. Further, the auxiliary light source 1130 may be installed to have a light-emitting surface thereof face sideways, and the light generated by the auxiliary light source 1130 may be guided by a light guide 1131 and may thus be emitted forward.

Figure 9:
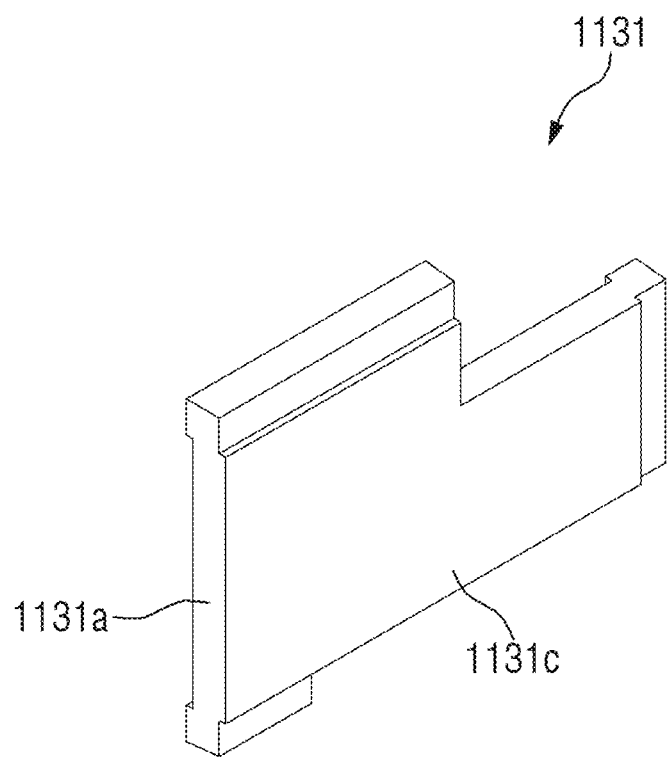
FIGS. 9 and 10 are perspective views of a light guide according to an embodiment of the present disclosure.
Figure 10:
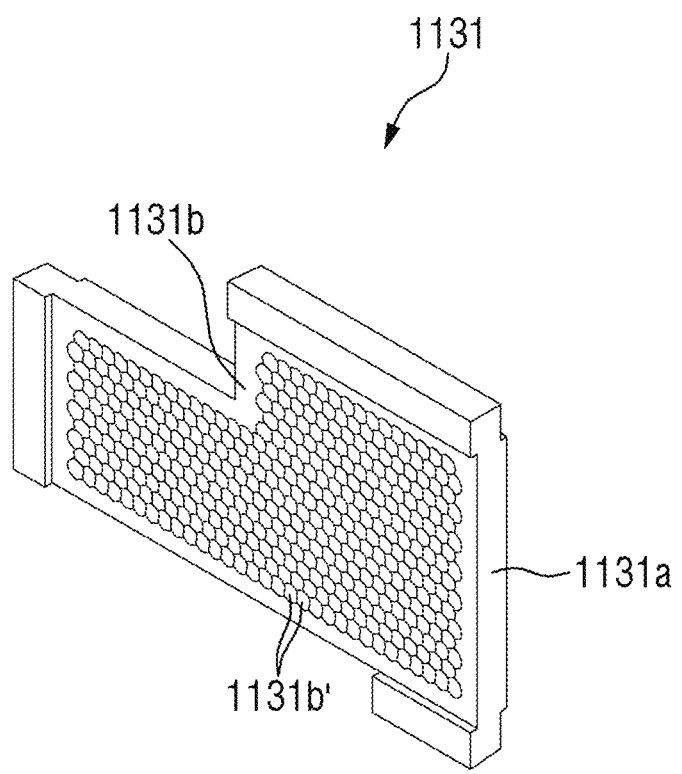

FIGS. 9 and 10 are perspective views of a light guide according to an embodiment of the present disclosure. Referring to FIGS. 9 and 10, a light guide 1131 may be formed not to cover a light-emitting surface of a main light source 1120, and may guide the light incident upon a side 1131a from an auxiliary light source 1130 to be reflected forward by a reflection pattern 1131b' and to be emitted through a front surface 1131c. Accordingly, the light guide 1131 may allow the main light source 1120 and the auxiliary light source 1130 to form beam patterns with appropriate intensities, while preventing or reducing interference between the main light source 1120 and the auxiliary light source 1130.

The main light source 1120 and the auxiliary light source 1130 may be installed on the same substrate 1110, and the light may be emitted from the auxiliary light source 1130 after being guided by the light guide 1131. Accordingly, there is no need to install the main light source 1120 and the auxiliary light source 1130 on separate substrates, and the main light source 1120 and the auxiliary light source 1130 may still emit light with appropriate intensities without interfering with each other. Accordingly, the structure of the light-emitting unit 1000 may be more simplified.

The light guide 1131, like the main light source 1120 and the auxiliary light source 1130, may be installed on the substrate 1110, but the present disclosure is not limited thereto. The light guide 1131 may be installed at various other locations where it is capable of properly guiding the light incident thereupon from the auxiliary light source 1130.

The optical path adjustment unit 2000 may adjust the path of light generated by the light-emitting unit 1000 such that the light may be incident upon the optical unit 3000 with minimal loss.

Figure 11:
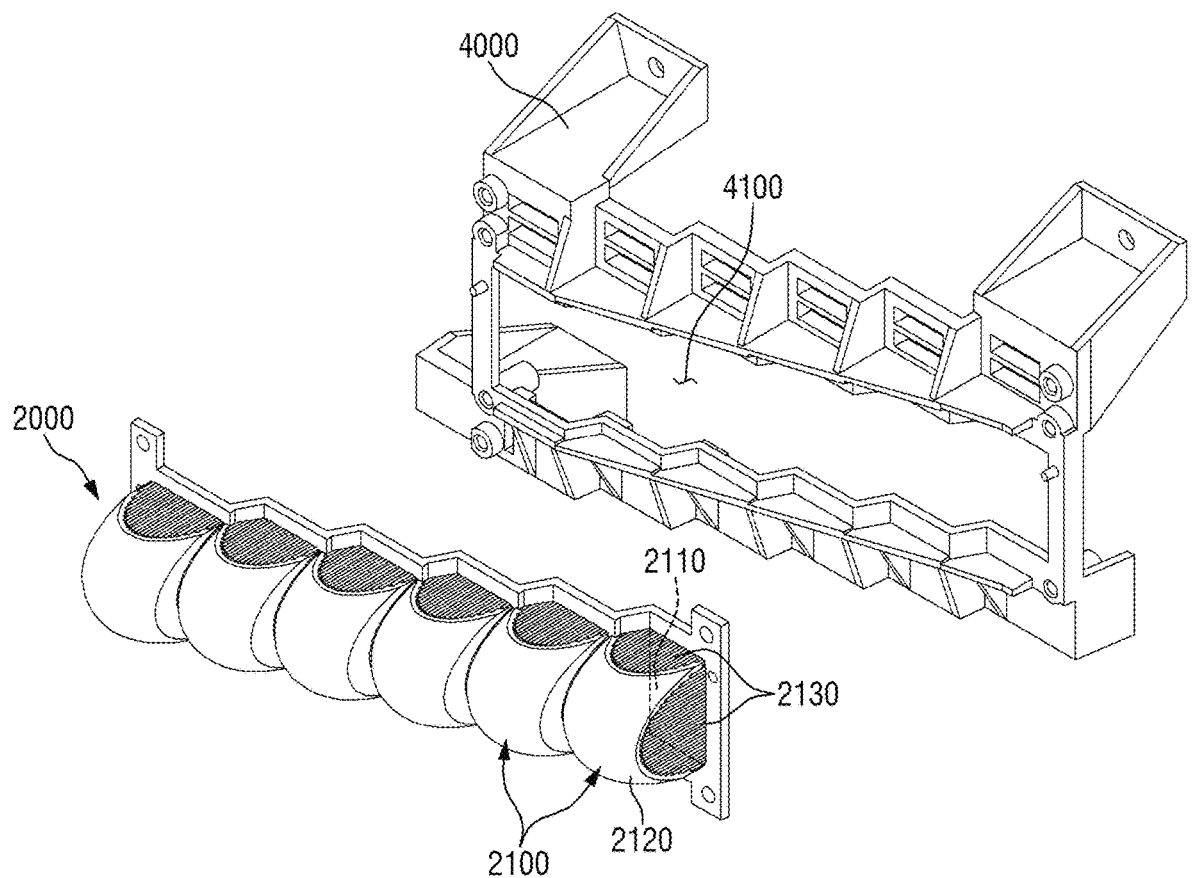
FIG. 11 is an exploded perspective view illustrating an optical path adjustment unit to be mounted in a first holder, according to an embodiment of the present disclosure.

FIG. 11 is an exploded perspective view illustrating an optical path adjustment unit to be mounted in a first holder, according to an embodiment of the present disclosure. Referring to FIG. 11, the optical path adjustment unit 2000 may include a plurality of collimator lenses 2100, which are disposed along the direction in which the light source modules 1100 are arranged, and the collimator lenses 2100 may be implemented as aspherical lenses capable of converting light incident thereupon from the respective light source modules 1100 into parallel light, but the present disclosure is not limited thereto. The collimator lenses 2100 may be used together with various optical elements for converting incident light into parallel light, such as reflectors, Fresnel lenses, and prisms.

The collimator lenses 2100 may be integrally formed in consideration that when the collimator lenses 2100 are spaced apart from one another, unintended blind zones may be formed in beam patterns generated by the vehicle lamp 1 due to the gaps between the collimator lenses 2100.

If the collimator lenses 2100 are integrally formed, the positions of the collimator lenses 2100 may not be adjustable individually to meet a set of light distribution conditions. Thus, instead, the heat dissipators 1140 of the light source modules 1100 may be implemented to be separate from one another, and the light distribution conditions may be satisfied by adjusting the positions of the light source modules 1100 via the heat dissipators 1140.

As the collimator lenses 2100 are formed in one body with one another, the heat dissipators 1140 of the light source modules 1100 may be formed to be separate from one another, but the present disclosure is not limited thereto. Alternatively, if the collimator lenses 2100 are implemented to be separate from one another, the heat dissipators 1140 of the light source modules 1100 may be integrally formed, in which case, the positions of the collimator lenses 2100 may be adjustable individually to meet the light distribution conditions.

One or more diffusion patterns 2130, such as knurling structures (e.g., undulation or surface roughness), may be formed on at least some portion of the side surfaces disposed between an incident side 2110 and an exit side 2120 of each of the collimator lenses 2100 to diffuse the light that proceeds in unintended directions, via the collimator lenses 2100, and thus to prevent glare in beam patterns formed by the vehicle lamp 1.

The optical path adjustment unit 2000 may be formed in a stepped configuration such that the collimator lenses 2100 may be disposed gradually rearward in a direction from one side to the other side, in the left-to-right direction, of the optical path adjustment unit 2000. Further, the optical path adjustment unit 2000 may be tilted such that one side, in the left-to-right direction, of the optical path adjustment unit 2000 may be disposed more rearward than the other side, in the left-to-right direction, of the optical path adjustment unit 2000. The collimator lenses 2100, like the light source modules 1100, may be understood as being arranged to conform to the shape of the body line of the vehicle.

The collimator lenses 2100 may be disposed gradually rearward in the direction from the inner side to the outer side of the vehicle in the left-to-right direction, but the present disclosure is not limited thereto. Alternatively, the positions of the collimator lenses 2100 may be varied depending on the shape of the body line of the vehicle.

The collimator lenses 2100 of the optical path adjustment unit 2000 may be mounted and fixed in a first holder 4000 where an opening 4100 is formed, and the light generated by each of the light source modules 1100 may be incident upon the respective collimator lenses 2100 through the opening 4100 and may be concentrated to proceed toward the optical unit 3000.

The first holder 4000 may be fixedly installed in the vehicle such that the collimator lenses 2100 may be disposed at the front of the respective light source modules 1100 in various coupling methods such as via screws, bolts-and-nuts, or hooks.

The optical unit 3000 may transmit light that is incident thereupon after being guided by the optical path adjustment unit 2000 and may thus form beam patterns suitable for the purpose(s) of the vehicle lamp 1. The optical unit 3000 may include a first optical lens module 3100 and a second optical lens module 3200, which is disposed in front of the first optical lens module 3100 along the proceeding direction of the light.

The first optical lens module 3100 may be tilted at a predetermined angle, for a similar purpose as the optical path adjustment unit 2000, such that one side, in the left-to-right direction, of the first optical lens module 3100 may be disposed more rearward than the other side thereof, in the left-to-right direction, of the first optical lens module 3100. The first optical lens module 3100 may allow the light that is incident thereupon after being guided by the optical path adjustment unit 2000 to proceed toward the second optical lens module 3200.

Figure 12:
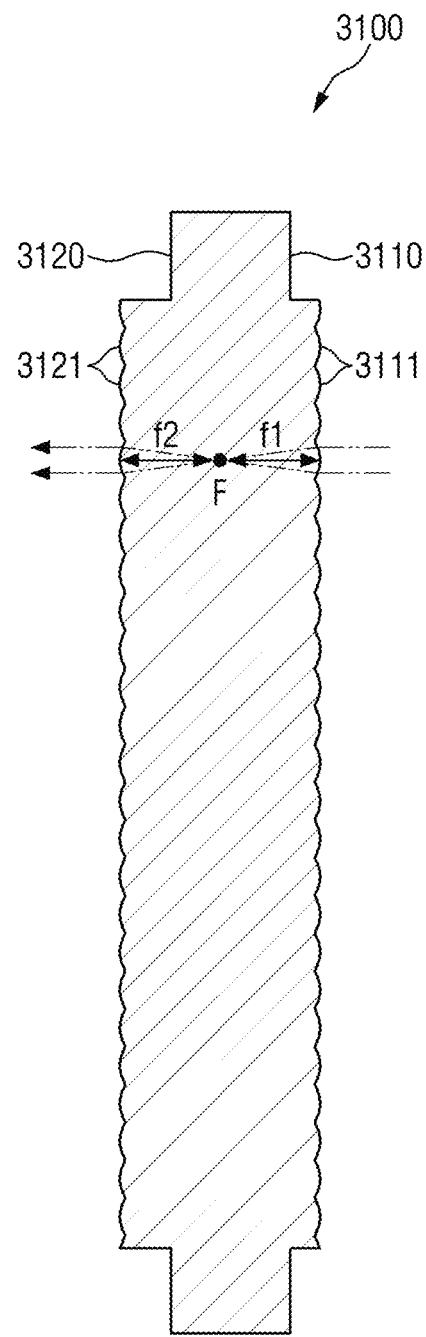
FIG. 12 is a cross-sectional view illustrating a first optical lens module according to an embodiment of the present disclosure.

FIG. 12 is a cross-sectional view illustrating a first optical lens module according to an embodiment of the present disclosure. Referring to FIG. 12, the first optical lens module 3100 may include a plurality of incident lenses 3111, which are formed on an incident side 3110, and a plurality of exit lenses 3121, which are formed on an exit side 3120. The first optical lens module 3100 will hereinafter be described as using, for example, microlenses having a relatively short focal length for the incident lenses 3111 and the exit lenses 3121.

The first optical lens module 3100 may extend in the direction in which the light source modules 1100 are arranged and may thus contribute to a slim form factor for the vehicle lamp 1. The first optical lens module 3100 may be formed such that the incident lenses 3111 and the corresponding exit lenses 3121 may have equal focal lengths f1 and f2 with respect to a focal point F, and the incident lenses 3111 and the exit lenses 3121 may correspond one-to-one.

Light guided to the optical path adjustment unit 2000 may be incident upon the second optical lens module 3200 via the first optical lens module 3100 to realize a surface emission of light with a substantially uniform brightness. More specifically, if the light emitted from the collimator lenses 2100 is incident directly upon the second optical lens module 3200, images formed by beams of the light emitted from the collimator lenses 2100 may become relatively large, and a perception of separation between the images may occur. In contrast, according to the embodiment of FIGS. 12 and 13, as the beams of light emitted from the exit lenses 3121 of the first optical lens module 3100 are incident upon the second optical lens module 3200, the perception of separation between images formed by the beams of light emitted from the exit lenses 3121 of the first optical lens module 3100 may be decreased, and as a result, the surface emission of light with a more uniform brightness may be realized.

The second optical lens module 3200 may emit light incident thereupon from the first optical lens module 3100 and may thus form a beam pattern suitable for the purpose(s) of use of the vehicle lamp 1.

Figure 13:
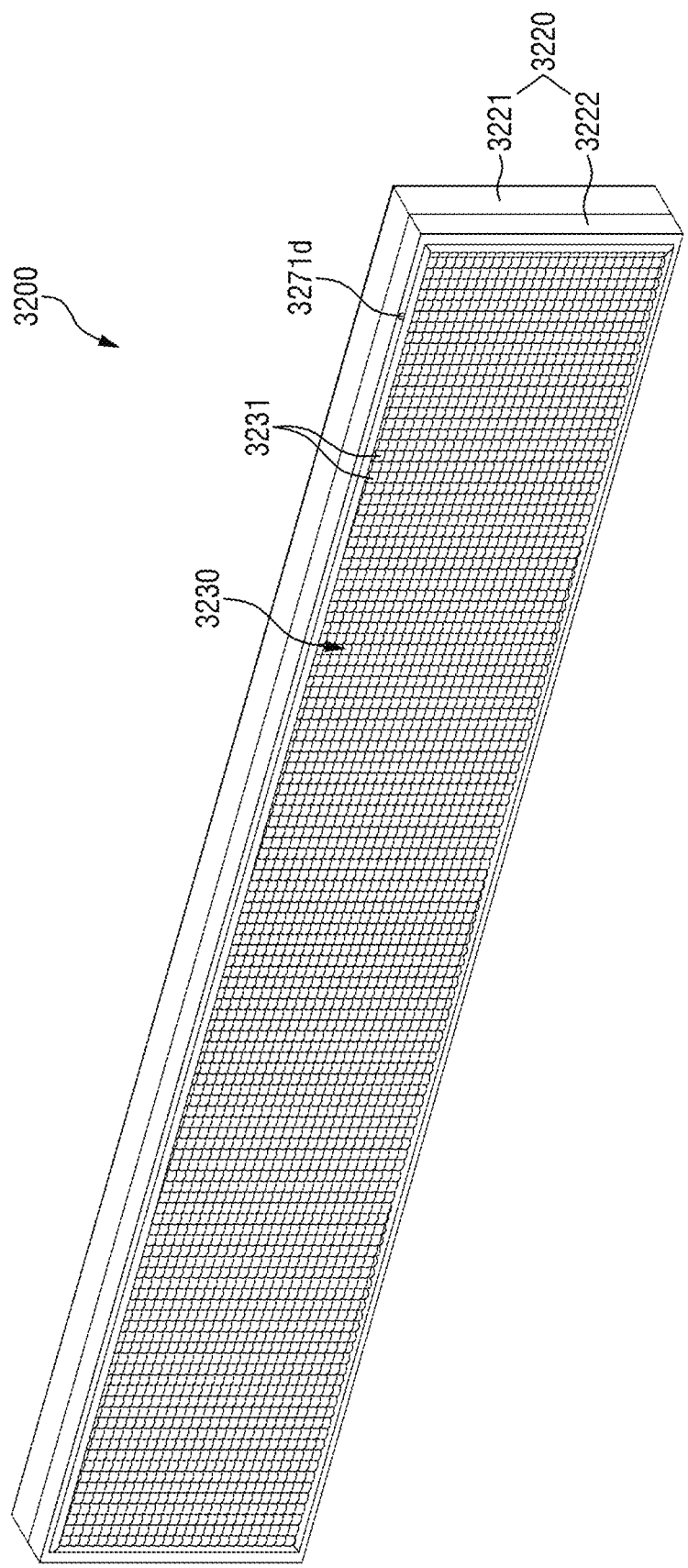
FIGS. 13 and 14 are perspective views illustrating a second optical lens module according to an embodiment of the present disclosure.
Figure 14:
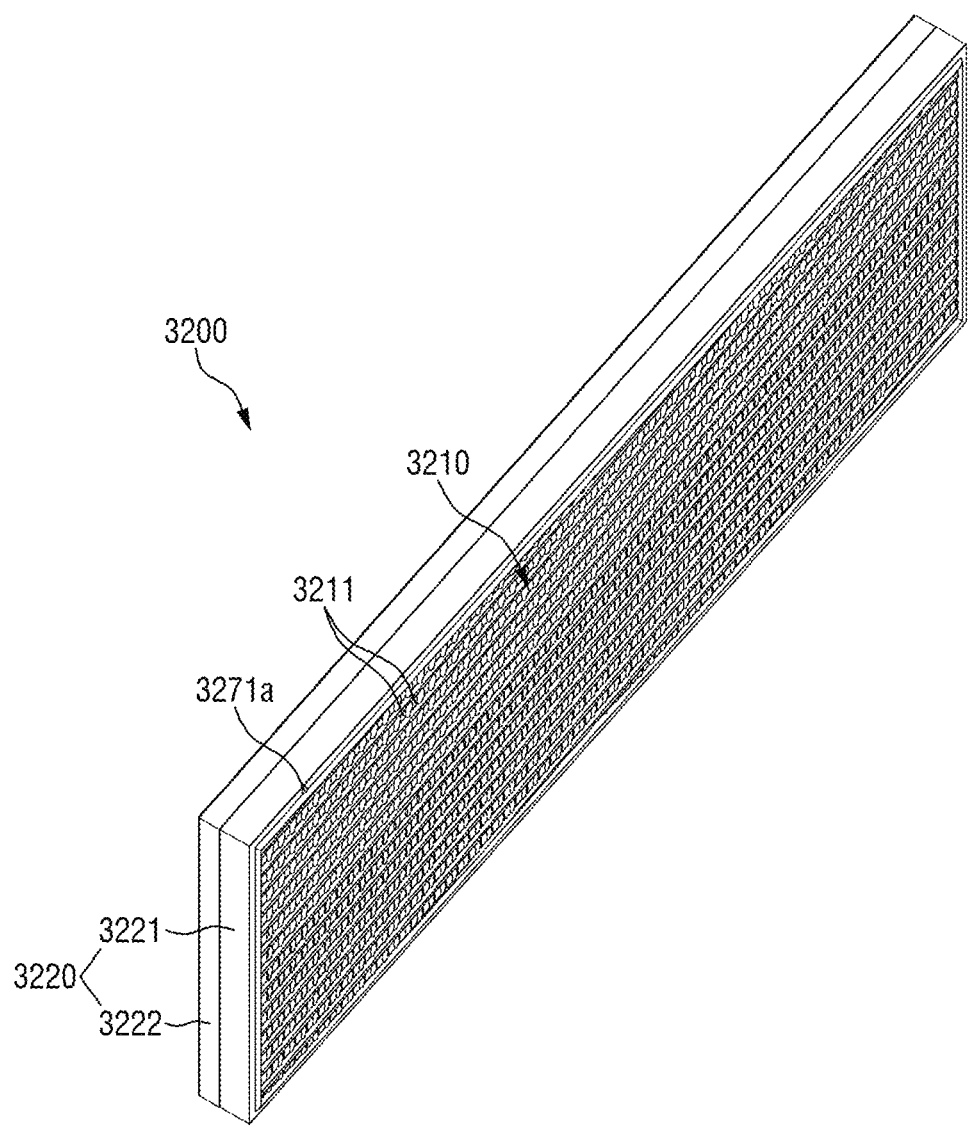
Figure 15:
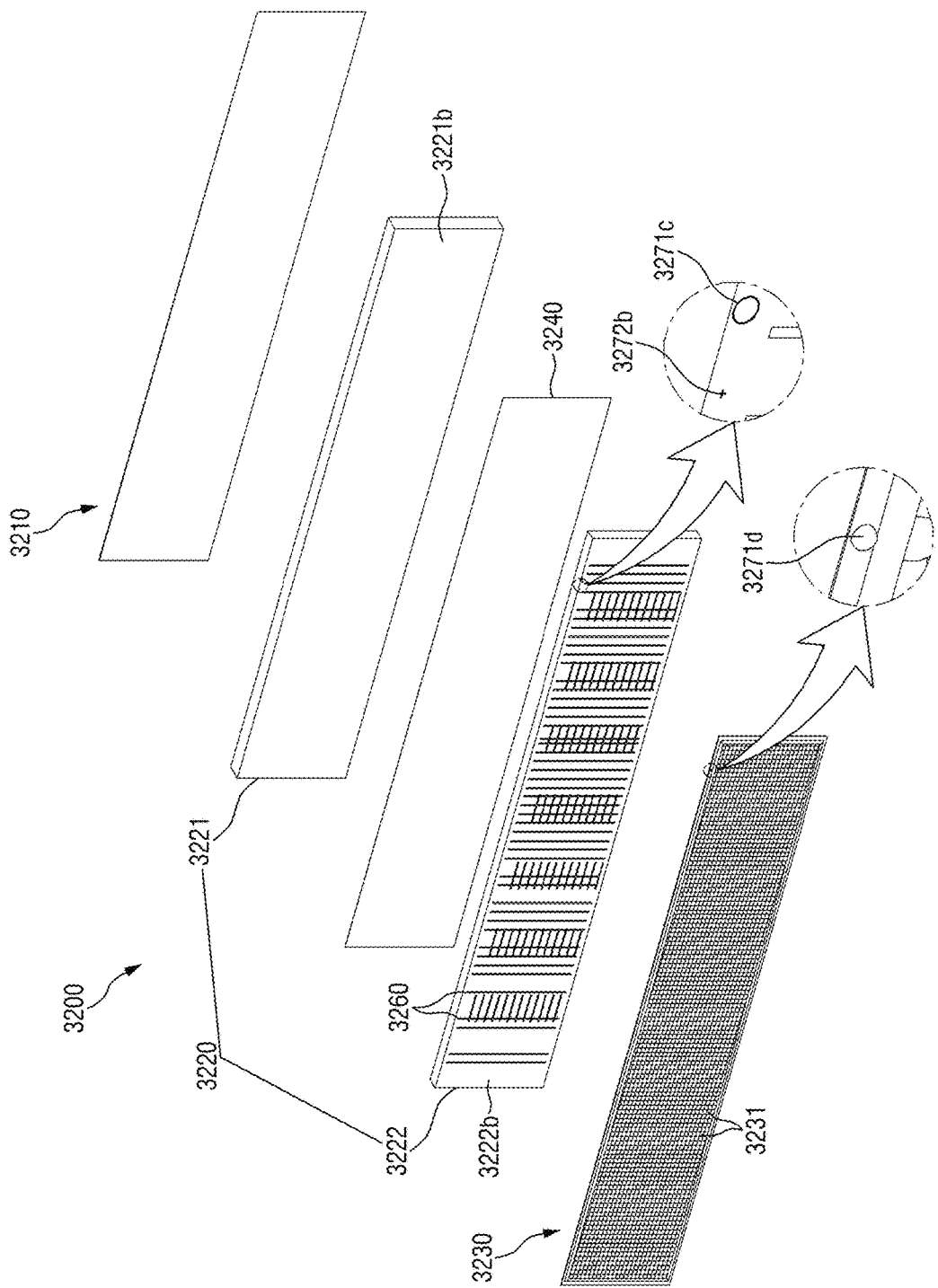
FIGS. 15 and 16 are exploded perspective views of the second optical lens module of FIGS. 13 and 14.
Figure 16:
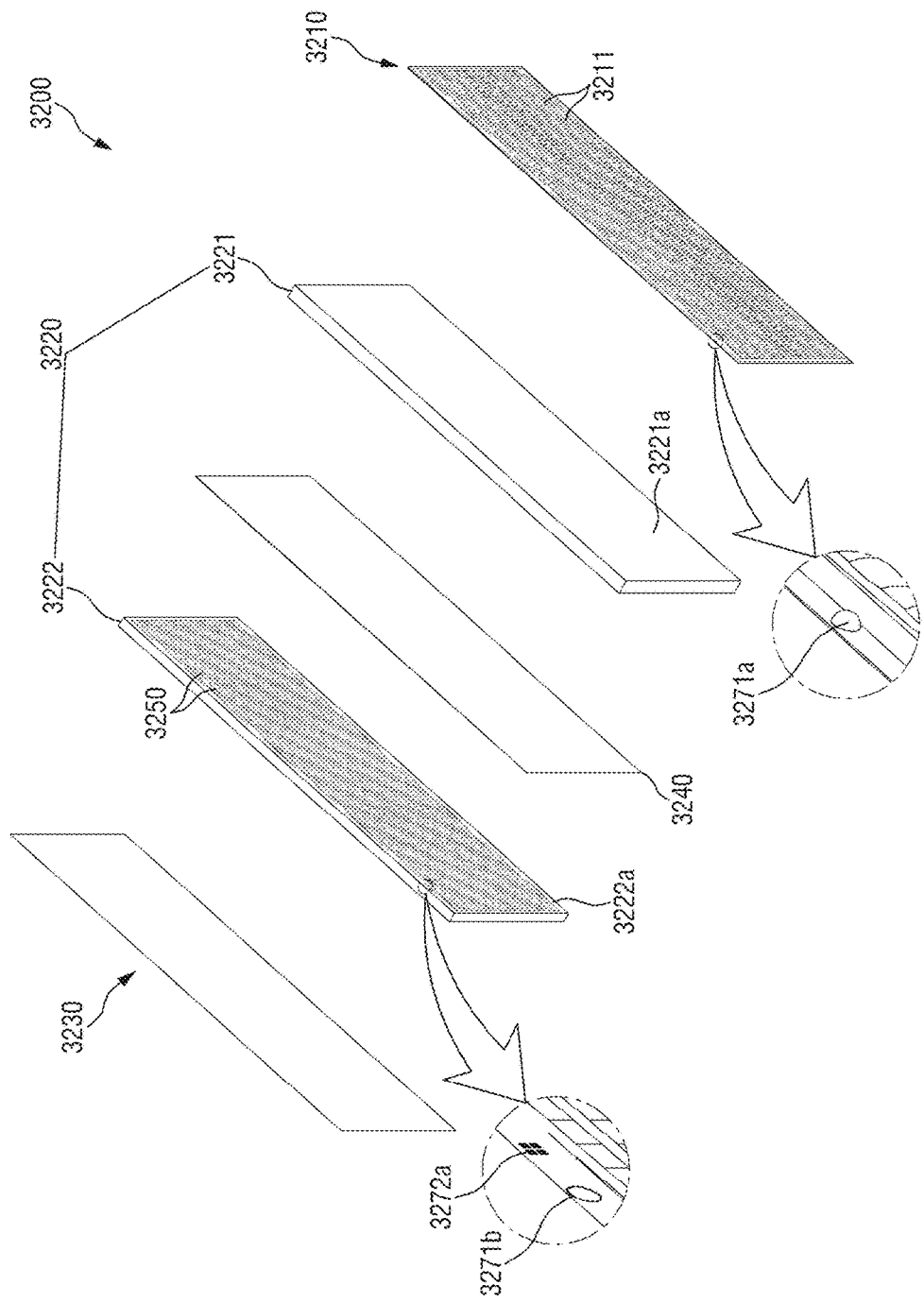

FIGS. 13 and 14 are perspective views illustrating a second optical lens module according to an embodiment of the present disclosure, and FIGS. 15 and 16 are exploded perspective views of the second optical lens module of FIGS. 13 and 14.

Referring to FIGS. 13 through 16, the second optical lens module 3200 may include an incident lens module 3210, an optical member 3220, and an exit lens module 3230. For similar reasons as the first optical lens 3100, the second optical lens module 3200 may be tilted, such that one side, in the left-to-right direction, of the second optical lens module 3200 may be disposed more rearward than the other side thereof, in the left-to-right direction.

The second optical lens module 3200, like the first optical lens module 3100, may be formed to extend in the direction in which the light source modules 1100 are arranged, and may thus contribute to a slim form factor for the vehicle lamp 1.

The incident lens module 3210 may include a plurality of incident lenses 3211, and the exit lens module 3230 may include a plurality of exit lenses 3231, which emit the light that is incident thereupon from the respective incident lenses 3211.

The optical member 3220 may include a first light-transmitting member 3221 and a second light-transmitting member 3222. The incident lens module 3210 may be disposed on an incident side 3221a of the first light-transmitting member 3221, and the exit lens module 3230 may be disposed on an exit side 3222b of the second light-transmitting member 3222. The exit side 3221b of the first light-transmitting member 3221 and the incident side 3222a of the second light-transmitting member 3222 may be joined together by an adhesive layer 3240 and may be disposed to face each other.

A plurality of first shields 3250 may be disposed between the first light-transmitting member 3221 and the second light-transmitting member 3222. In some embodiments, the first shields 3250 may not be included, and the optical member 3220 may include a single light-transmitting member.

The incident lenses 3211 of the second optical lens module 3200 may be formed to extend in one direction, and the light incident upon each of the incident lenses 3211 may proceed toward a plurality of neighboring exit lenses 3231. Due to such configuration, the beam patterns formed by the vehicle lamp 1 may be widened in the left-to-right direction, thereby improving the quality of the field of view. However, the present disclosure is not limited thereto. In the second optical lens 3200, the incident lenses 3211 may be configured to correspond to the exit lenses 3231 by one-to-one, one-to-many, many-to-one, and many-to-many, depending on the light distribution conditions for beam patterns to be formed by the vehicle lamp 1.

The first shields 3250 may be formed on the incident side 3222a of the second light-transmitting member 3222, and a plurality of second shields 3260 may be formed on the exit side 3222b of the second light-transmitting member 3222.

Figure 17:
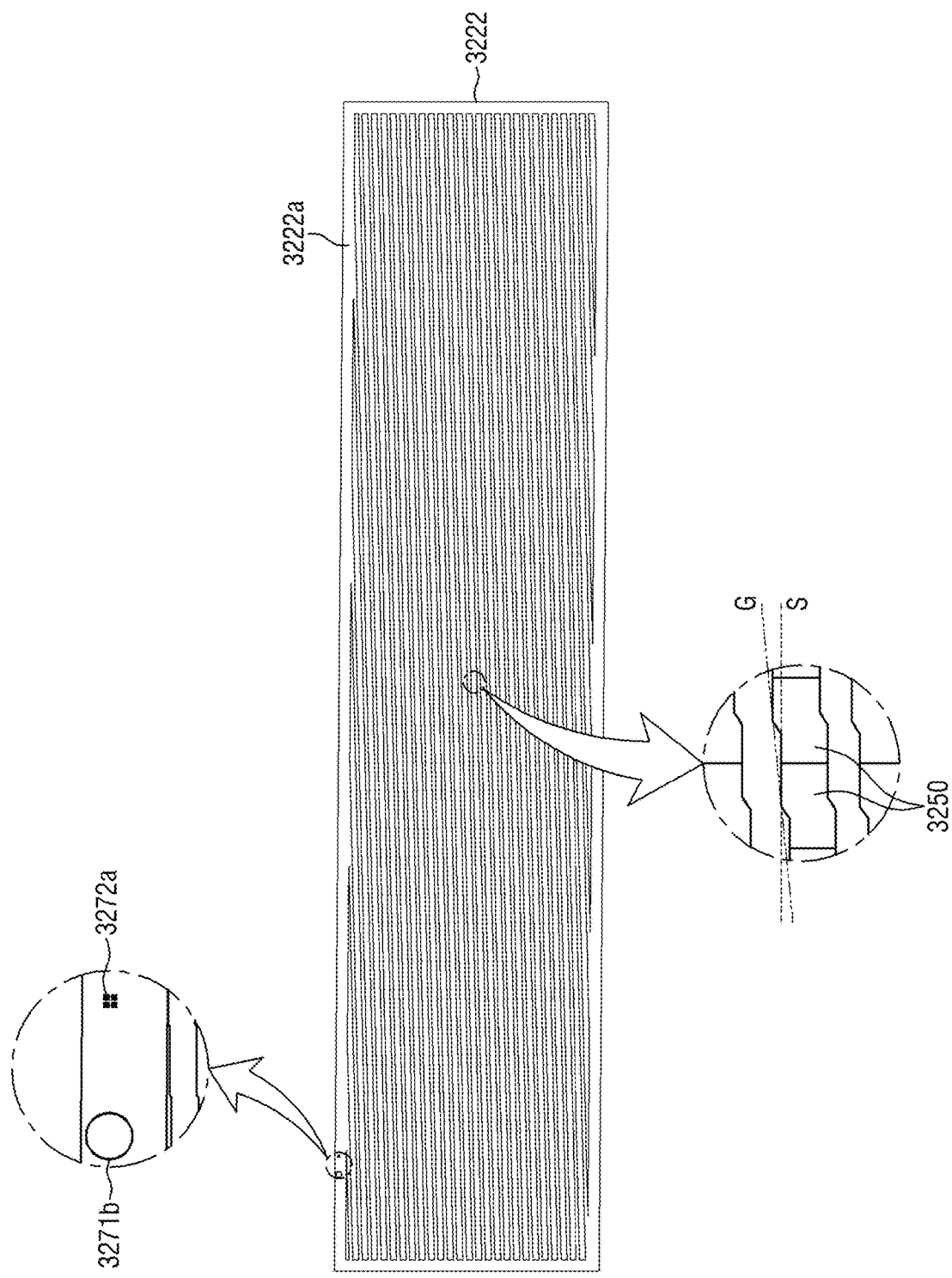
FIG. 17 is a rear view illustrating a second light-transmitting member with a plurality of first shields formed thereon, according to an embodiment of the present disclosure.
Figure 18:
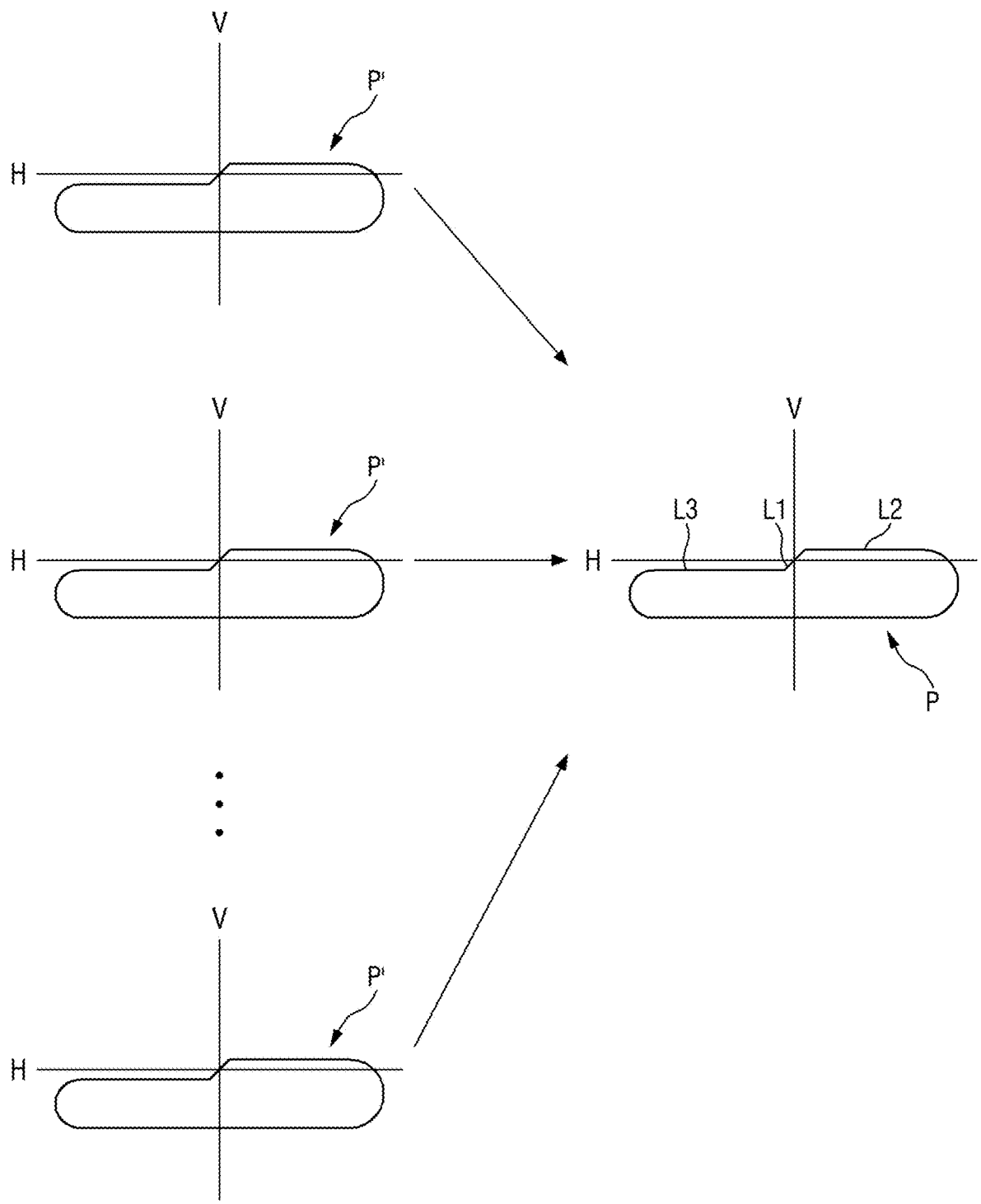
FIG. 18 is a schematic view illustrating a beam pattern formed by the vehicle lamp of FIGS. 1 and 2.
Figure 19:
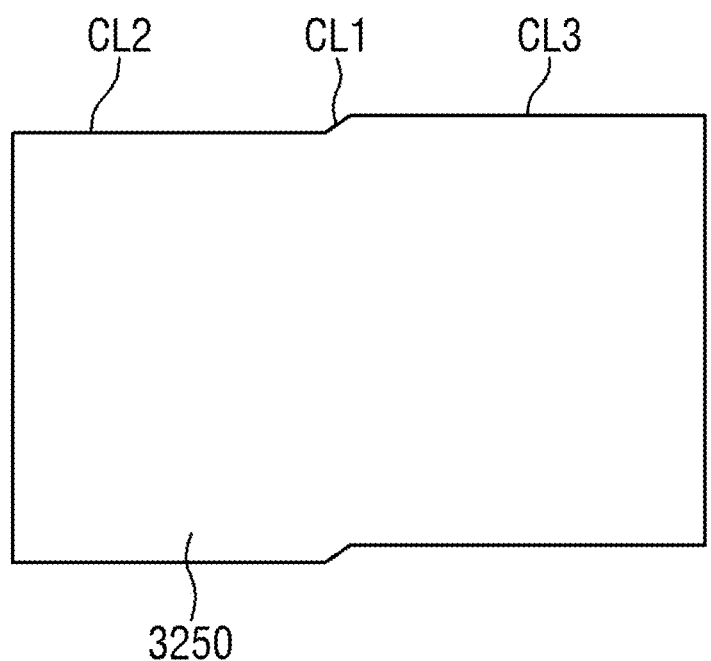
FIG. 19 is a schematic view illustrating a first shield according to an embodiment of the present disclosure.

FIG. 17 is a rear view illustrating a second light-transmitting member with a plurality of first shields formed thereon, according to an embodiment of the present disclosure. Referring to FIG. 17, the first shields 3250 may block (e.g., obstruct) some of beams of light that proceeds toward the respective exit lenses 3231, thereby forming a cutoff line for the first beam pattern. As such, referring to FIG. 18, sub-beam patterns P' that are formed by the first shields 3250 may collectively form a first beam pattern P.

The cutoff line for the first beam pattern P includes an inclined line L1, an upper line L2, which extends horizontally from the upper end of the inclined line L1, and a lower line L3, which extends horizontally from the lower end of the inclined line L1. Accordingly, each of the upper edges of the first shields 3250 may include an inclined edge CL1, a lower-upper edge CL2, which forms the upper line L2, and an upper-upper edge CL3, which forms the lower line L3. The shape of the upper edges of the first shields 3250 may vary depending on the desired shape of the cutoff line for the first beam pattern P.

The first shields 3250 may be arranged in a plurality of rows, each extending in the left-to-right direction, and the plurality of rows of the first shields 3250 may be arranged in a vertical direction. In each of the rows of the first shields 3250, the first shields 3250 may be arranged at an inclination with respect to a horizontal line S such that no step may be present between each pair of adjacent first shields 3250. When the rows of the first shields 3250 are arranged at an inclination in the left-to-right direction, an imaginary line G that connects the same parts of the first shields 3250, for example, the upper ends of the inclined edges CL1 of the first shields 3250, may be inclined with respect to the horizontal line S.

Figure 20:
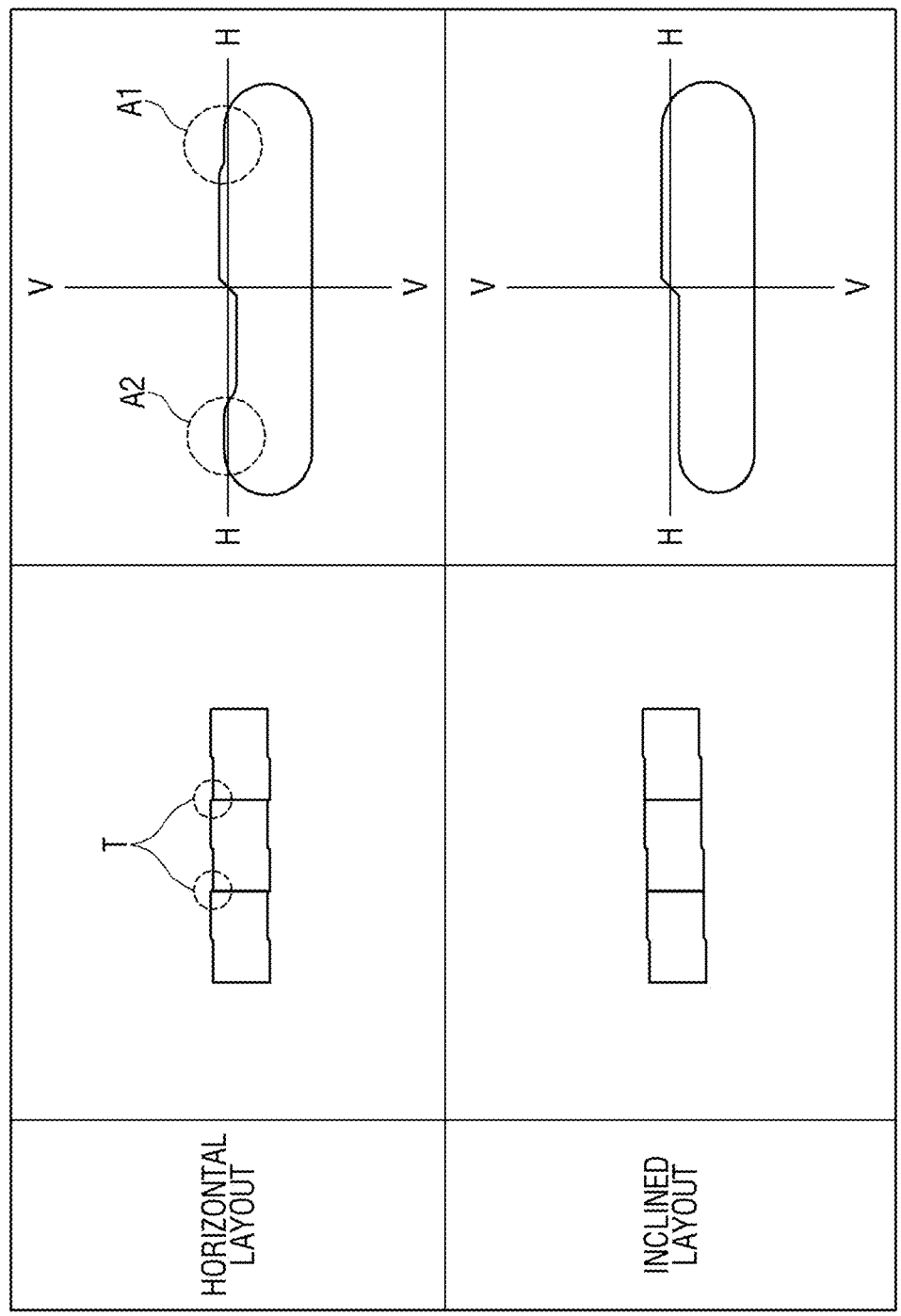
FIG. 20 is a schematic view illustrating a beam pattern for the layout of a plurality of first shields according to an embodiment of the present disclosure.

In each of the rows of the first shields 3250, if the first shields 3250 are arranged to have step or height differences T between one another, as illustrated in the upper row of FIG. 20, parts A1 and A2 of a cutoff line for a low beam pattern may be disposed higher or lower than their designated locations. This issue can be addressed by arranging the rows of the first shields 3250 at an inclination. As a result, deterioration of the field of view of the driver and/or the generation of glare to the driver of a preceding or on-coming vehicle may be prevented or minimized.

When the rows of the first shields 3250 are arranged at an inclination, the position of the focal point may be changed, and thus, the incident lenses 3211 and the exit lenses 3231 in each row may also be arranged at an inclination. Also, the incident lenses 3111 and the exit lenses 3121 of the first optical lens module 3100 may be arranged in a plurality of rows at an inclination to correspond to the plurality of rows of the first shields 3250. The second shields 3260 may prevent or reduce glare from being caused by the light irradiated above the cutoff line for a first beam pattern.

Figure 21:
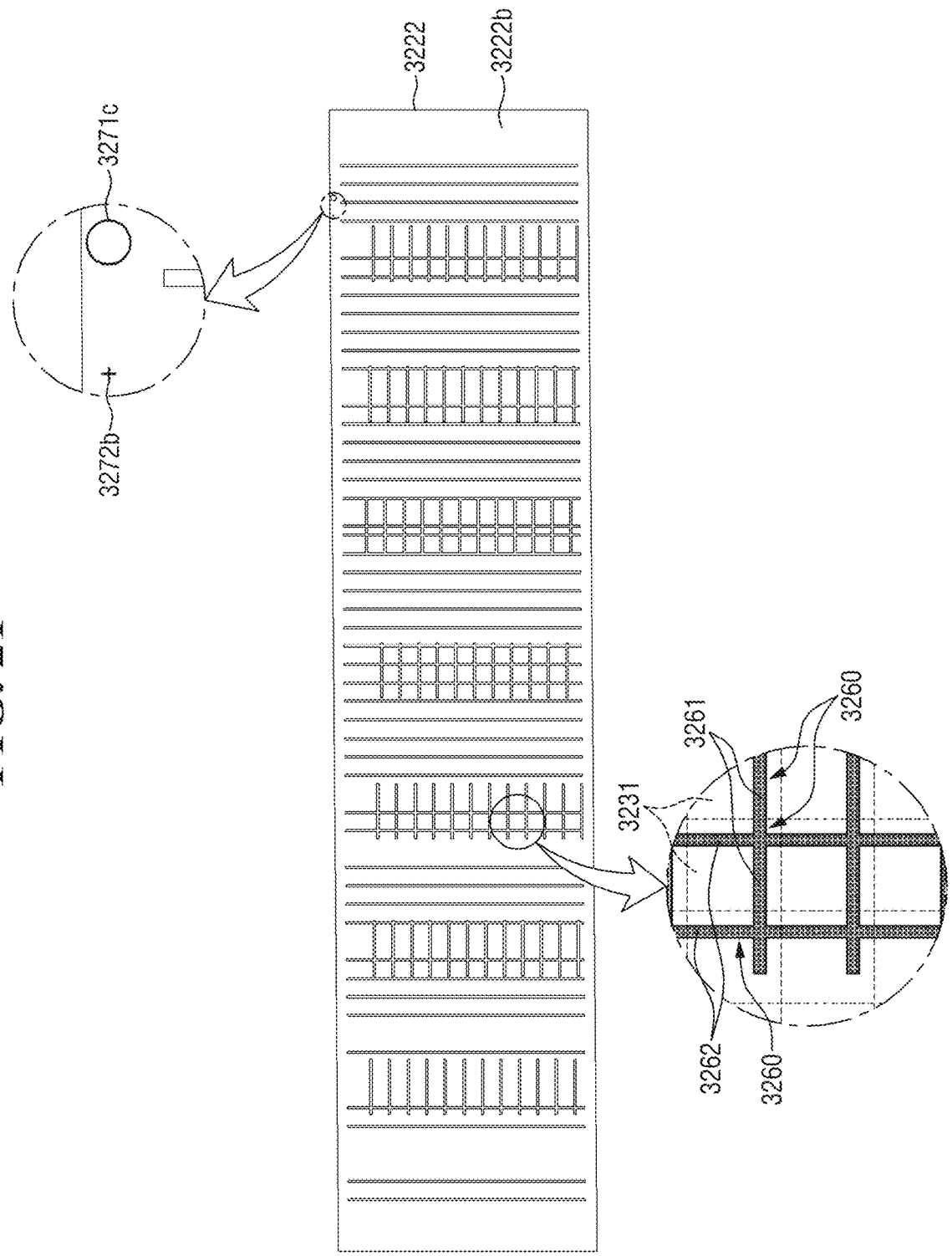
FIG. 21 is a front view illustrating a second light-transmitting member with a plurality of second shields formed thereon, according to an embodiment of the present disclosure.

FIG. 21 is a front view of a second light-transmitting member with a plurality of second shields formed thereon, according to an embodiment of the present disclosure. Referring to FIG. 21, second shields 3260 may include horizontal shields 3261 and/or vertical shields 3262. The horizontal shields 3261 may be formed to be lower than the respective first shields 3250 and may thus block some of the light incident upon the lower parts of the respective exit lenses 3231 by being irradiated above the cutoff line for a first beam pattern. In other words, upper ends of the horizontal shields 3261 may be disposed below upper ends of respective first shields 3250. In some such embodiments, the horizontal shields 3261 of the second shields 3260 may have lower heights than corresponding first shields 3250. The vertical shields 3262 may prevent glare that may occur due to the second optical lens module 3200 being tilted with the exit lenses 3231 asymmetrically formed in the left-to-right direction.

In other words, if the second optical lens module 3200 is disposed perpendicular to a front-to-back direction, the incident lenses 3211 and the exit lenses 3231 may be symmetrically formed in the left-to-right direction. On the other hand, since the second optical lens module 3200 is tilted, the incident lenses 3211 and the exit lenses 3231 may be required to be asymmetrically formed to allow the light to be emitted forward from the second optical lens module 3200 even though the second optical lens module 3200 is tilted. However, due to the second optical lens module 3200 being tilted, it may be more difficult to control the optical path of light, and thus, some of the light emitted from the second optical lens module 3200 may be irradiated above the cutoff line for a first beam pattern and may cause glare. To prevent such glare, the vertical shields 3262 may be provided.

The second shields 3260 may not necessarily be formed for all of the exit lenses 3231. More specifically, depending on the direction in which the light is emitted from each of the exit lenses 3231, the second shields 3260 may be formed for all or some of the exit lenses 3231, and the second shields 3260 may include at least one of the vertical shields 3261 or the vertical shields 3262.

In FIG. 21, where dotted lines indicate the exit lenses 3231, an example is shown in which the second shields 3260 are formed for some, not all, of the exit lenses 3231, and some of the second shields 3260 include both the horizontal shields 3261 and the vertical shields 3262, but some other second shields 3260 do not include the horizontal shields 3261 or the vertical shields 3262.

As the second optical lens module 3200 is formed by coupling the incident lens module 3210, the optical member 3220, and the exit lens module 3230 to one another, there is the need to properly align the incident lens module 3210, the optical member 3220, and the exit lens module 3230 with one another. To this end, one or more alignment elements may be included in at least one of the incident lens module 3210, the optical member 3220, or the exit lens module 3230 to aid aligning them with one another.

Figure 22:
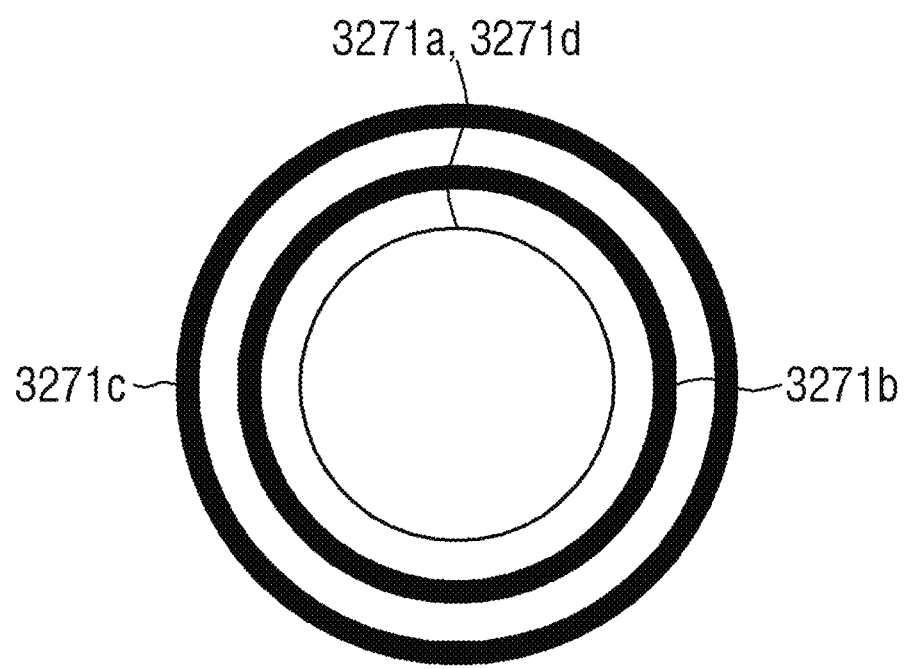
FIG. 22 is a schematic view illustrating first alignment elements according to an embodiment of the present disclosure.
Figure 23:
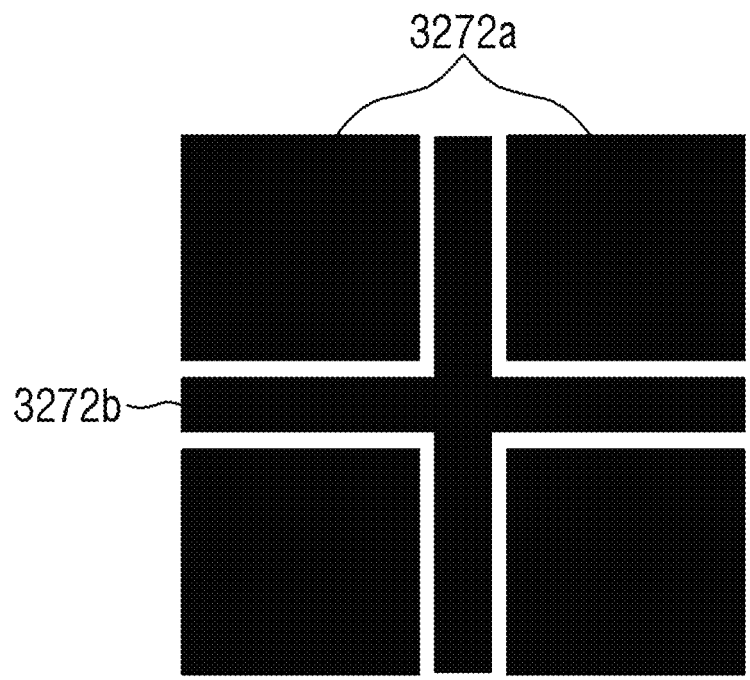
FIG. 23 is a schematic view illustrating second alignment elements according to an embodiment of the present disclosure.

For example, referring to FIGS. 15 and 16, first alignment elements 3271a, 3271b, 3271c, and 3271d may be formed at the incident lens module 3210, the incident side 3222a and the exit side 3222b of the second light-transmitting member 3222, and the exit lens module 3230, respectively. Similarly, second alignment elements 3272a and 3272b may be formed on the incident side 3222a and the exit side 3222b of the second light-transmitting member 3222, respectively. In this example, due to the first alignment elements 3271a, 3271b, 3271c, and 3271d having a predefined shape, as illustrated in FIG. 22, and the second alignment elements 3272a and 3272b having a predefined shape, as illustrated in FIG. 23, the incident lenses 3211, the exit lenses 3231, the first shields 3250, and the second shields 3260 may be aligned with one another between the incident lens module 3210, the optical member 3220, and the exit lens module 3230, thereby satisfying the light distribution conditions for beam patterns to be formed by the vehicle lamp 1.

The first alignment elements 3271a, 3271b, 3271c, and 3271d and the second alignment elements 3272a and 3272b shown in the drawings are merely exemplary, and the present disclosure is not limited thereto. N-th alignment elements may be formed in at least one of the elements of the second optical lens module 3200 that needs to be aligned with the rest of the second optical lens module 3200, and the shape into which the N-th alignment elements are combined together may vary.

The first optical lens module 3100 and the second optical lens module 3200 may be mounted and fixed in a second holder 5000 with a passage aperture 5100 formed therethrough, and the second holder 5000 may be fixedly installed in the vehicle in a similar manner as the first holder 4000.

Depending on a set of required light distribution conditions and/or the design of the vehicle, a plurality of vehicle lamps 1 may be required. In such a case, unintended blind zones may be formed due to the gap between the vehicle lamps 1. To this end, at least one additional light source 1150 may be further installed in at least one light source module 1100 at either end of the array of the light source modules 1100 (see FIGS. 7 and 8).

Figure 24:
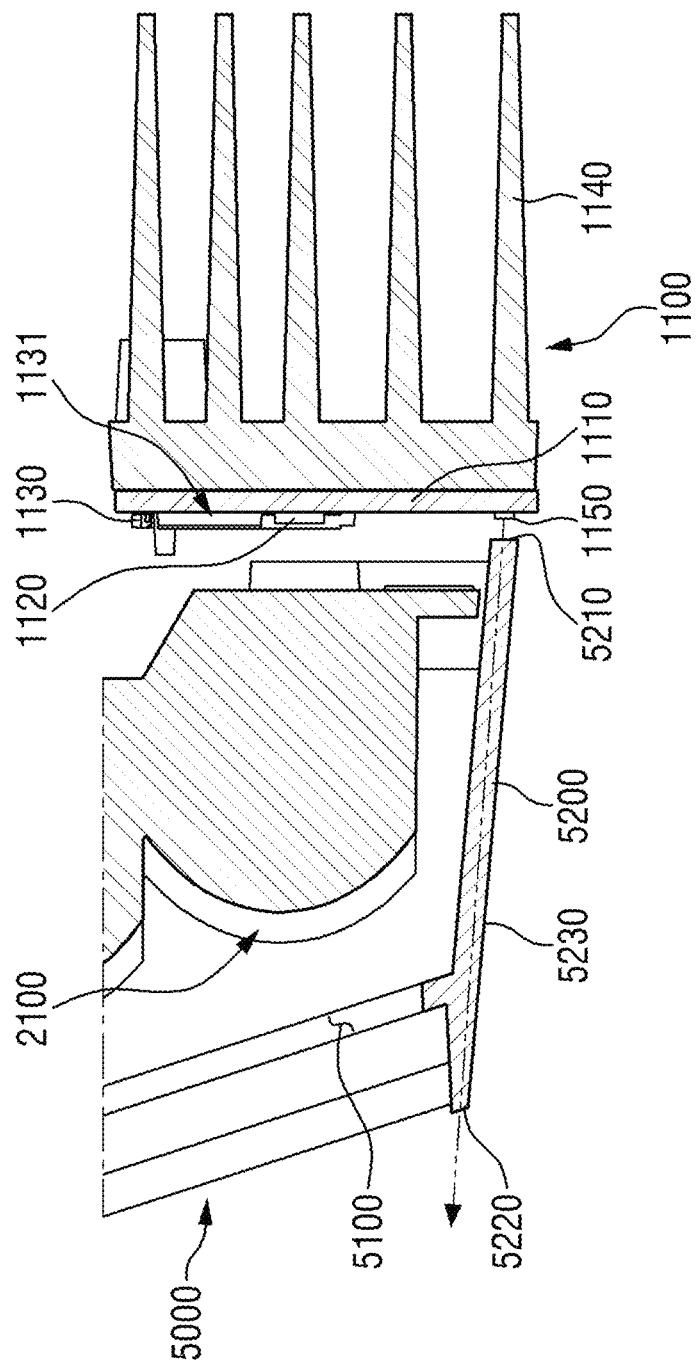
FIG. 24 is a schematic view illustrating an additional light source and a light transmitter according to an embodiment of the present disclosure.
Figure 25:
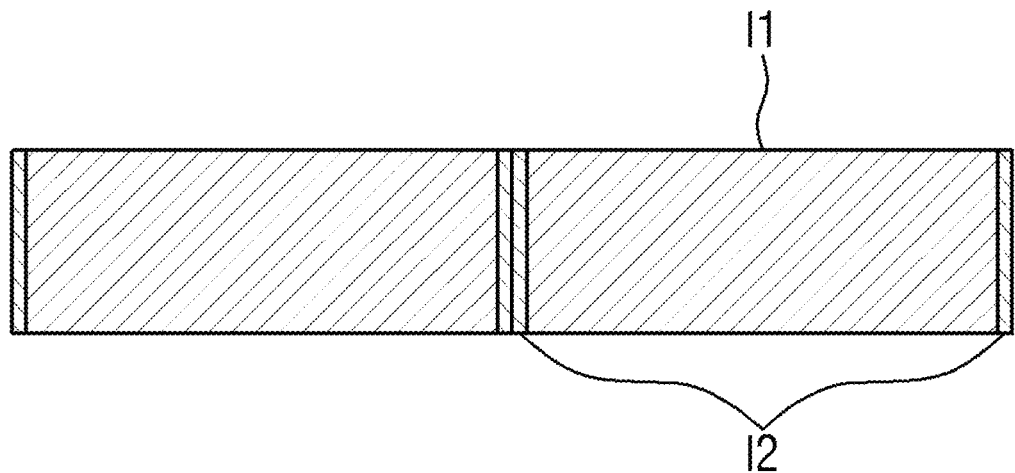
FIG. 25 is a schematic view illustrating images formed by light emitted from an optical unit and light emitted from a light transmitter according to an embodiment of the present disclosure.

Referring to FIG. 24, the light generated by the additional light source 1150 may be transmitted via a light transmitter 5200, which is formed at at least some edges of the second holder 5000 in a direction of the array of the light source modules 1100, to be emitted forward between the vehicle lamp 1 and a neighboring vehicle lamp 1. Accordingly, referring to FIG. 25, when the plurality of vehicle lamps 1 are provided, additional images 12 may be generated by at least one additional light source 1150 of each of the plurality of vehicle lamps 1, between images I1 generated by the second optical lens modules 3200 of the plurality of vehicle lamps 1. Accordingly, even when the plurality of vehicle lamps 1 are provided, an image with a sense of unity in appearance may be generated as a whole.

FIG. 24 illustrates an example where a single light transmitter 5200 is provided, but the present disclosure is not limited thereto. Two or more light transmitters 5200 may be provided and disposed on the path of light emitted from the additional light source 1150.

Referring to FIG. 24, as the second holder 5000 is fixedly installed in the vehicle, the light transmitter 5200 may be disposed near the additional light source 1150, and light incident upon an incident side 5210 of the light transmitter 5200 from the additional light source 1150 may be emitted through an exit side 5220 of the light transmitter 5200. Diffusion patterns (e.g., knurling patterns) may be formed on the exit side 5220 of the light transmitter 5200, or the exit side 5220 of the light transmitter 5200 may be etched to facilitate light diffusion. Accordingly, a sense of heterogeneity in appearance may be prevented or minimized between the light emitted from the optical unit 3000 and light emitted from the light transmitter 5200.

A reflective layer may be formed on at least some sides 5230 between the incident side 5210 and the exit side 5220 of the light transmitter 5200 using a material such as aluminum (Al) or chromium (Cr). As a result, light that passes through the light transmitter 5200 may be prevented from being emitted through the sides 5230.

One or more additional light sources 1150 may be further installed in each of the two light source modules 1100 at either end of the array of light source modules 1100, but the present disclosure is not limited thereto. The additional light sources 1150 may be installed in the light source module 1100 at one end of the array of light source modules 1100.

The light transmitter 5200 of the second holder 5000 may be formed of a material capable of transmitting light therethrough, but the present disclosure is not limited thereto. The entire second holder 5000 may be formed of a material capable of transmitting light therethrough.

The first optical lens module 3100, like the second optical lens module 3200, may use microlenses, but the present disclosure is not limited thereto. Aspherical lenses may be used in the first optical lens module 3100, like in the optical path adjustment unit 2000, depending on beam patterns to be formed by the vehicle lamp 1.

Figure 26:
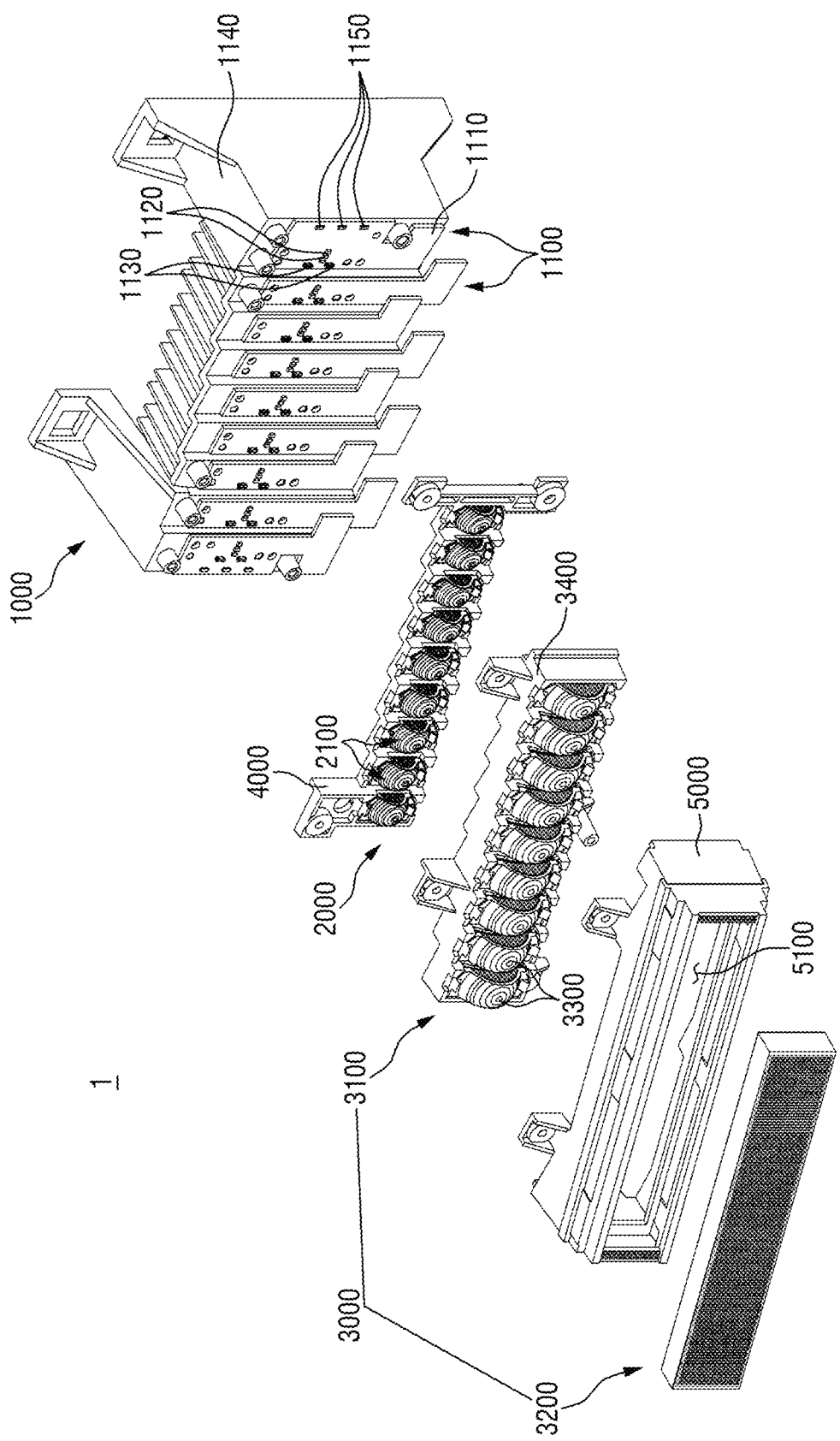
FIGS. 26 and 27 are exploded perspective views of a vehicle lamp according to another embodiment of the present disclosure.
Figure 27:
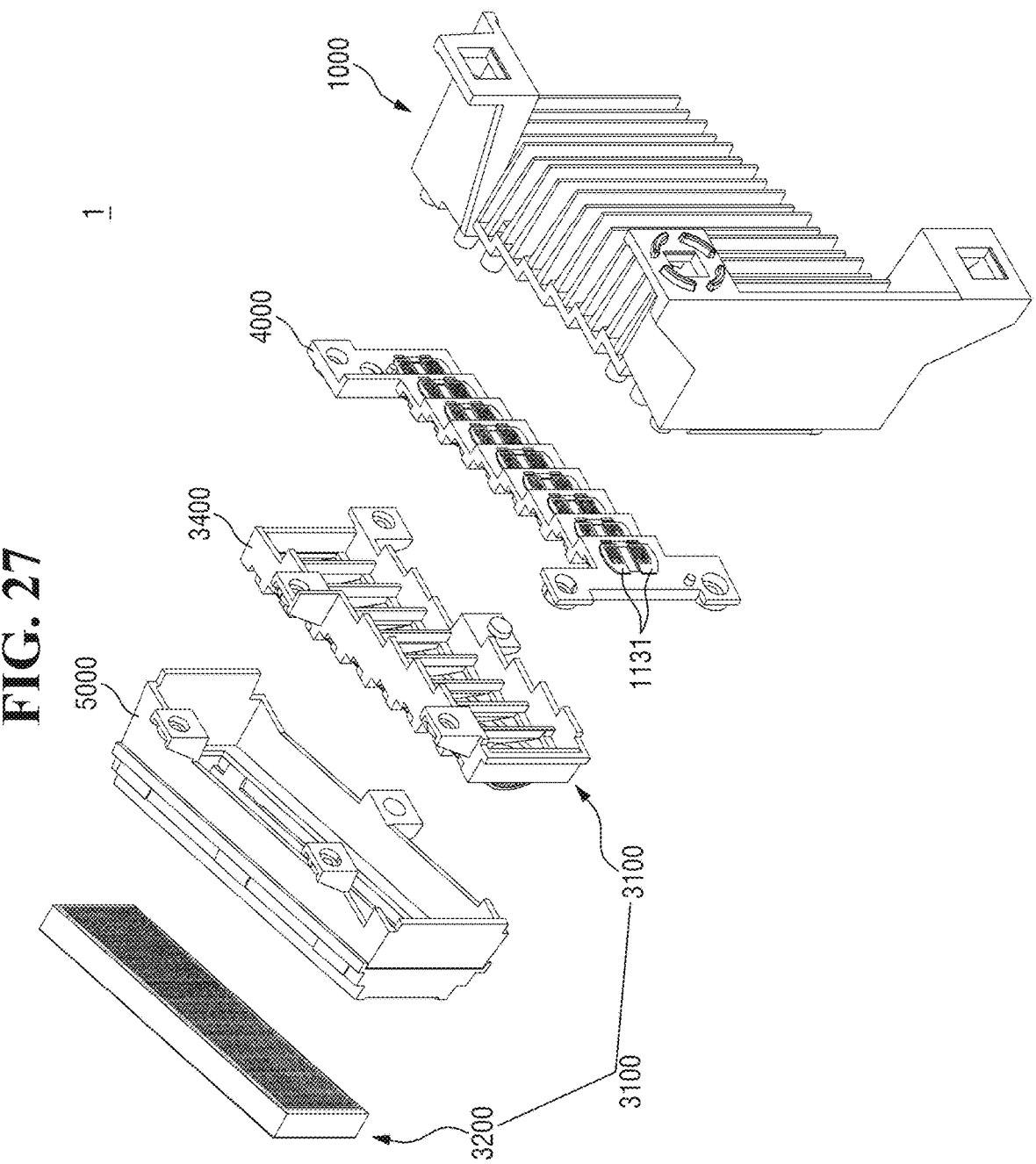

FIGS. 26 and 27 are exploded perspective views of a vehicle lamp according to another embodiment of the present disclosure. Referring to FIGS. 26 and 27, a vehicle lamp 1, like its counterpart illustrated in FIGS. 1 and 2, may include a light-emitting unit 1000, an optical path adjustment unit 2000, and an optical unit 3000. The light-emitting unit 1000, the optical path adjustment unit 2000, and the optical unit 3000 may have substantially the same functions as their respective counterparts, and thus, detailed descriptions thereof will be omitted.

The optical path adjustment unit 2000 may include a plurality of collimator lenses 2100, which correspond to the plurality of light source modules 1100, and the collimator lenses 2100 may be installed in the first holder 4000 such that the collimator lenses 2100 may be provided separately from one another, and the positions of the collimator lenses 2100 may be adjustable individually. In the embodiment of FIGS. 26 and 27, unlike in the embodiment of FIGS. 1 and 2, a set of light distribution conditions may be satisfied by adjusting the positions of the collimator lenses 2100.

In other words, the vehicle lamp 1, unlike its counterpart illustrated in FIGS. 1 and 2, may form a high beam pattern, while preventing light from being irradiated or reducing the amount of light being irradiated to the location of another vehicle in front to form an unlit zone. In this case, the collimator lenses 2100 may be separated from one another.

As the collimator lenses 2100 are separated from one another, the heat dissipators 1140 of the light source modules 1100 may be formed in one body because there would be no need to adjust the positions of the light source modules 1100 to meet the set of light distribution conditions.

Figure 28:
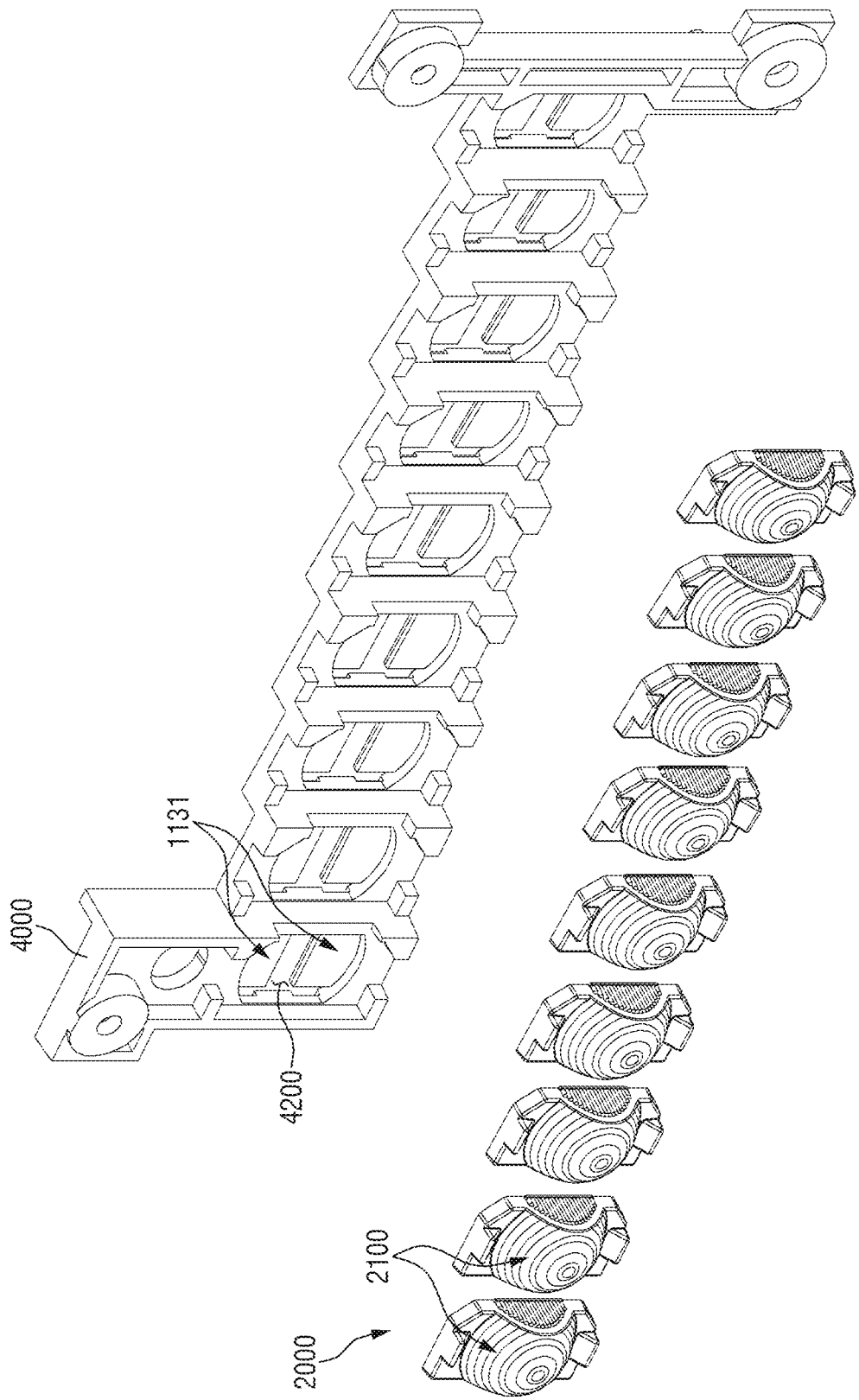
FIGS. 28 and 29 are exploded perspective view illustrating a first holder with an optical path adjustment unit mounted therein, according to an embodiment of the present disclosure.
Figure 29:
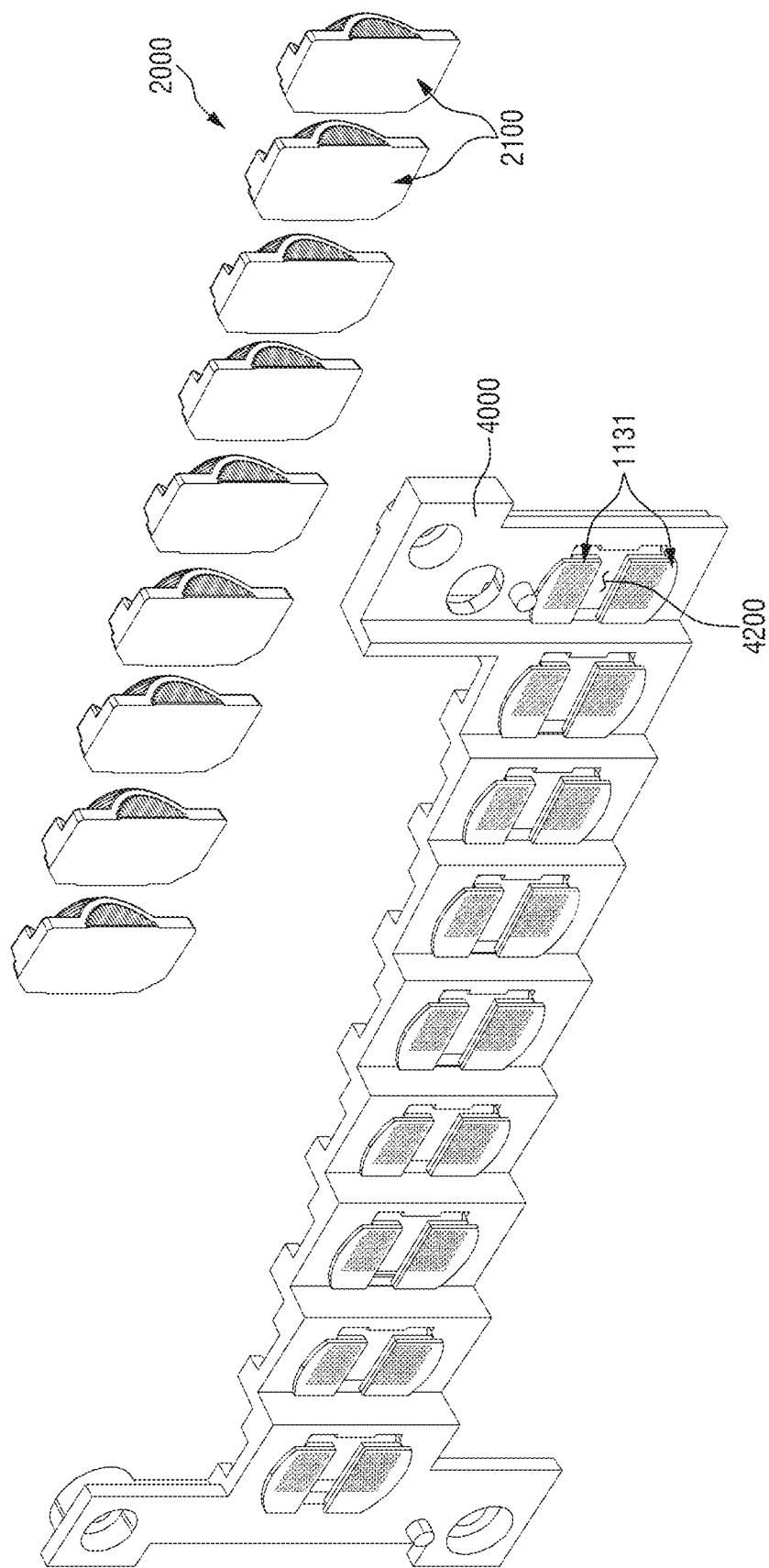

Referring to FIGS. 28 and 29, a plurality of apertures 4200 may be formed in a first holder 4000 to correspond to the respective light source modules 1100, and one or more light guides 1131 may be integrally formed with the first holder 4000 at at least some portion of edges of each aperture 4200 to correspond to each of the plurality of light source modules 1100, whereas in the embodiment of FIGS. 1 and 2, the light guides 1131 are disposed in the respective light source modules 1100.

Figure 30:
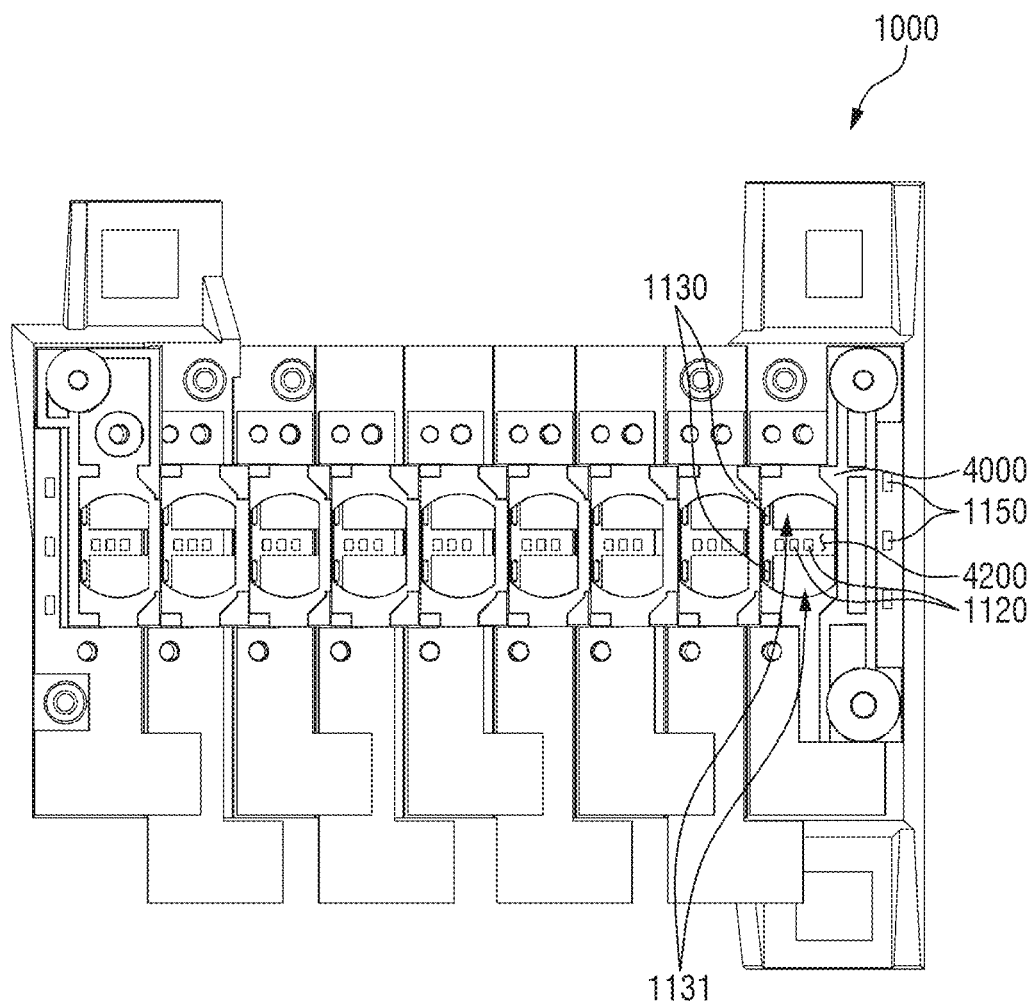
FIG. 30 is a front view illustrating a front holder positioned at the front of a light-emitting unit, according to an embodiment of the present disclosure.

In this case, referring to FIG. 30, as the light guides 1131 are integrally formed with the first holder 4000, a sufficient field of view may be secured via a first beam pattern by preventing the amount of light emitted from the main light sources 1120 from decreasing, and the light generated sideways from auxiliary light sources 1130 may be guided to be emitted forward.

The optical unit 3000 may include a first optical lens module 3100 and a second optical lens module 3200, and the first optical lens module 3100 may include a plurality of optical lenses 3300, which correspond to the respective collimator lenses 2100. The optical lenses 3300, like the collimator lenses 2100, may use aspherical lenses, and diffusion patterns may be included in the optical lenses 3300, like in the collimator lenses 2100, on at least some portion of the sides formed between an incident side and an exit side of each of the optical lenses 3300.

As the first optical lens module 3100 includes the optical lenses 3300, the optical lenses 3300 may be mounted in a lens bracket 3400, which is fixedly installed in the vehicle. As such, in the embodiment shown in FIGS. 1 and 2, the first optical lens module 3100 and the second optical lens module 3200 may be disposed at both sides of the passage aperture 5100 of the second holder 5000, but in the embodiment of FIGS. 26 and 27, the first optical lens module 3100, which includes the optical lenses 3300, may be mounted in the lens bracket 3400, which is provided separately from the second holder 5000.

In the embodiment of FIGS. 26 and 27, unlike in the embodiment of FIGS. 1 and 2, the first optical module 3100 may use aspherical lenses, rather than microlenses, to turn on or off each of the light source modules 1100 and thus to form an unlit zone at the location of a vehicle in front. Accordingly, surface light emission with a uniform brightness may not be required.

Since the vehicle lamp 1 forms a high beam pattern, the second optical lens module 3200, unlike its counterpart illustrated in FIGS. 1 and 2, may not include the first shields 3250 or the second shields 3260. Accordingly, an optical member 3220 may include a single light-transmitting member.

Since the optical unit 3000 is formed to extend in the left-to-right direction, a slim form factor may be achieved, and since the incident lenses 3111 and the exit lenses 3121 of the first optical lens module 3100 include microlenses and may achieve the surface emission of light with a more uniform brightness, the beam patterns formed by the vehicle lamp 1 may generally have a more uniform brightness. Therefore, visibility may be improved, and a sense of heterogeneity in appearance may be prevented.

Further, the vehicle lamp 1 may prevent glare using not only the first shields 3250, but also the second shields 3260, which include the horizontal shields 3261 and/or the vertical shields 3262.

Further, as the main light sources 1120 and the auxiliary light sources 1130 share the substrates 1110, the structure of the vehicle lamp 1 may be simplified, and light may be generated with an appropriate intensity by the main light sources 1120 and the auxiliary light sources 1130 without interference therebetween. As one or more additional light sources 1150 may be further installed, images with a sense of cosmetic unity can be generated between adjacent vehicle lamps 1.

In concluding the detailed description, those skilled in the art will appreciate that many variations and modifications can be made to the exemplary embodiments without departing from the principles of the present disclosure. Therefore, the disclosed embodiments are to be used in a generic and descriptive sense only and not for purposes of limitation.

What is claimed is:

1. A vehicle lamp comprising:
    a light-emitting unit that includes a plurality of light source modules, which are arranged side-by-side;
    an optical path adjustment unit that includes a plurality of collimator lenses, each of which adjusts a path of light generated by each of the plurality of light source modules; and
    an optical unit that transmits the light, which is incident thereupon after being guided by the optical path adjustment unit, thereby allowing a predetermined beam pattern to be formed,
    wherein the optical unit includes a first optical lens module, upon which the light guided by the optical path adjustment unit is incident, and a second optical lens module, upon which the light transmitted through the first optical lens module is incident,
    wherein the first optical lens module includes a plurality of incident lenses and a plurality of exit lenses, which correspond to one another, and
    wherein the second optical lens module includes a plurality of incident lenses and a plurality of exit lenses, which correspond to one another.

2. The vehicle lamp of claim 1, wherein each of the plurality of light source modules includes a substrate, on which one or more light sources are installed, and a heat dissipator, on which the substrate is mounted,
    wherein one of the collimator lenses of the optical path adjustment unit or the heat dissipators of the light source modules are integrally formed, and
    wherein the other of the collimator lenses or the heat dissipators are formed separately from one another.

3. The vehicle lamp of claim 1, wherein diffusion patterns are formed on at least some portion of side surfaces disposed between an incident side and an exit side of each of the plurality of collimator lenses.

4. The vehicle lamp of claim 1, wherein the plurality of incident lenses and the plurality of exit lenses are implemented as microlenses.

5. The vehicle lamp of claim 1, wherein in the first optical lens module, an incident lens among the plurality of incident lenses has a focal length that is equal to a focal length of a corresponding exit lens among the plurality of exit lenses.

6. The vehicle lamp of claim 1, wherein the second optical lens module comprises:
    an incident lens module, which includes the plurality of incident lenses;
    an exit lens module, which includes the plurality of exit lenses; and
    an optical member, which is disposed between the incident lens module and the exit lens module,
    wherein the optical member includes a first light-transmitting member, which includes the incident lens module disposed on an incident side of the first light-transmitting member, and a second light-transmitting member, which includes the exit lens module disposed on an exit side of the second light-transmitting member, and
    wherein the incident side and an exit side of the first light-transmitting member are opposite to each other.

7. The vehicle lamp of claim 6, wherein the second optical lens module further includes an adhesive layer disposed between the exit side of the first light-transmitting member and an incident side of the second light-transmitting member to join the first light-transmitting member and the second light-transmitting member.

8. The vehicle lamp of claim 6, wherein one or more alignment elements are included in at least one of the incident lens module, the exit lens module, the first light-transmitting member, or the second light-transmitting member for aiding positional alignment.

9. The vehicle lamp of claim 8, wherein each of the plurality of second shields includes at least one of a horizontal shield or a vertical shield.

10. The vehicle lamp of claim 9, wherein an upper end of the horizontal shield of a second shield among the plurality of second shields is disposed below an upper end of a respective first shield among the plurality of first shields.

11. The vehicle lamp of claim 6, wherein the optical member comprises:
    a plurality of first shields, which obstruct some of the light that proceeds toward the plurality of exit lenses; and
    a plurality of second shields disposed in front of the plurality of first shields.

12. The vehicle lamp of claim 11, wherein the plurality of first shields are formed on an incident side of the second light-transmitting member, and
    wherein the plurality of second shields are formed on the exit side of the second light-transmitting member.

* * * * *